United States Patent
Ono

(10) Patent No.: US 7,123,741 B2
(45) Date of Patent: Oct. 17, 2006

(54) TECHNIQUE OF EMBEDDING AND DETECTING DIGITAL WATERMARK

(75) Inventor: Tsukasa Ono, Tokyo (JP)

(73) Assignee: Kowa Co., Ltd., Aichi-Ken (JP)

( * ) Notice: Subject to any disclaimer, the term of this patent is extended or adjusted under 35 U.S.C. 154(b) by 775 days.

(21) Appl. No.: 10/139,602

(22) Filed: May 2, 2002

(65) Prior Publication Data

US 2003/0012402 A1 Jan. 16, 2003

(30) Foreign Application Priority Data

Jul. 12, 2001 (JP) ............................. 2001-212448

(51) Int. Cl.
*G06K 9/00* (2006.01)

(52) U.S. Cl. ...................................... 382/100; 713/176

(58) Field of Classification Search ................ 382/100, 382/232; 713/176; 348/460
See application file for complete search history.

(56) References Cited

U.S. PATENT DOCUMENTS

| | | | |
|---|---|---|---|
| 5,991,426 A * | 11/1999 | Cox et al. ................... | 382/100 |
| 6,044,156 A | 3/2000 | Honsinger et al. | |
| 6,208,735 B1 * | 3/2001 | Cox et al. ...................... | 380/54 |
| 6,600,828 B1 * | 7/2003 | Kawamura ................... | 382/100 |
| 6,700,991 B1 * | 3/2004 | Wu et al. .................... | 382/100 |
| 6,721,439 B1 * | 4/2004 | Levy et al. ................. | 382/100 |
| 6,839,673 B1 * | 1/2005 | Choi et al. .................. | 704/273 |
| 2002/0106104 A1 * | 8/2002 | Brunk et al. ................ | 382/100 |

OTHER PUBLICATIONS

Bernd Jahne, "Digital Image Processing—Concepts, Algorithms, and Scientific Applications," Springer-Verlag, Abstract No. XP-002259494, pp. 56-62 (1991).

Kang et al., "Image Data Embedding System for Watermaking Using Fresnel Tarnsform," IEEE Comput. Soc., pp. 885-889, (1999).

Hartung et al., "Digital Watermaking of MPEG-2 Coded Video in the Bitstream Domain," IEEE Comput. Soc. pp. 2621-2624, (1997).

(Continued)

*Primary Examiner*—Jingge Wu
*Assistant Examiner*—Anand Bhatnagar
(74) *Attorney, Agent, or Firm*—Beyer, Weaver & Thomas LLP.

(57) ABSTRACT

A color conversion module 42 carries out color conversion of original color image data $G_{rgb}$ from the RGB color system into the CMYK color system to obtain color-converted original color image data $G_{cmyk}$ (step S104). A DCT module 44 applies DCT (discrete cosine transform) over the whole color-converted original color image data $G_{cmyk}$ to generate DCT coefficients $D_{cmyk}$ (step S106). An embedding module 46 embeds the watermark information s into the components C, M, Y, and K of the DCT coefficients $D_{cmyk}$ (step S108). An IDCT module 48 applies IDCT (inverse discrete cosine transform) onto DCT coefficients $D'_{cmyk}$ with the watermark information s embedded therein to generate embedding-processed color image data $G'_{cmyk}$ (step S110). The color conversion module 42 carries out color conversion of the embedding-processed color image data $G'_{cmyk}$ from the CMYK color system into the RGB color system to obtain embedding-processed color image data $G'_{rgb}$ (step S112). This arrangement does not require any correction of the position or the shape of image blocks in the process of extracting the embedded watermark information.

2 Claims, 27 Drawing Sheets

OTHER PUBLICATIONS

Rakocevic et al., "The Image Authenticity Confirmation by Modifying Spectral Components," IEEE MeleCon, vol. 11, pp. 494-497, (2000).

Cox et al., "Secure Spread Spectrum Watermarking from Multimedia," NEC Research Institute, Technical Report 95-10, Abstract No. XP-002259493, pp. 1-33, (1995).

Kowa Co., Ltd., Notification of the First Office Action, The Patent Office of the People's Republic of China. (Chinese Office Action with English Translation.) 4 pages.

Ingemar J. Cox, et al., "Secure Spread Spectrum Watermarking for Multimedia," IEEE Transactions on Image Processing, vol. 6, No. 12, Dec. 1997.

* cited by examiner (a)

| Computer | Macintosh Quadra800 by Apple Computer, Inc. |
|---|---|
| Printer | PM3000C by Seiko Epson Corporation |
| Software for Printing | Photoshop4.0J by Adobe Systems, Inc. |
| Scanner | GT-9000 by Seiko Epson Corporation |
| Software for Taking in | EPSON SCAN Ver2.12J by Seiko Epson Corporation |
| 2-Dimensional DCT and DFT | Intel Signal Processing Library by Intel Corporation |

| $V_1$ | a | b | Extraction Rate | | | | |
|---|---|---|---|---|---|---|---|
| | | | C | M | Y | K | CMYK |
| 40 | 6 | 6 | 72.7% | 100.0% | 100.0% | 90.9% | 90.9% |
| 40 | 4 | 4 | 70.6% | 94.1% | 82.4% | 88.2% | 94.1% |
| 40 | 2 | 2 | 63.6% | 87.9% | 78.8% | 72.7% | 84.8% |
| 20 | 6 | 6 | 72.7% | 81.8% | 81.8% | 81.8% | 81.8% |
| 20 | 4 | 4 | 76.5% | 64.7% | 82.4% | 64.7% | 76.5% |
| 20 | 2 | 2 | 42.4% | 51.5% | 60.6% | 48.5% | 54.5% |

| $V_1$ | w | c,d | Extraction Rate | | | | |
|---|---|---|---|---|---|---|---|
| | | | C | M | Y | K | CMYK |
| 8000 | 6 | 5.5 | 70.6% | 94.1% | 94.1% | 94.1% | 94.1% |
| 6000 | 6 | 5.5 | 70.6% | 94.1% | 94.1% | 94.1% | 94.1% |
| 8000 | 8 | 7.2 | 92.3% | 100.0% | 100.0% | 100.0% | 100.0% |
| 6000 | 8 | 7.2 | 84.6% | 100.0% | 100.0% | 100.0% | 100.0% |
| 8000 | 10 | 9.0 | 90.9% | 100.0% | 100.0% | 100.0% | 100.0% |
| 6000 | 10 | 9.0 | 90.9% | 90.9% | 90.9% | 100.0% | 90.9% |

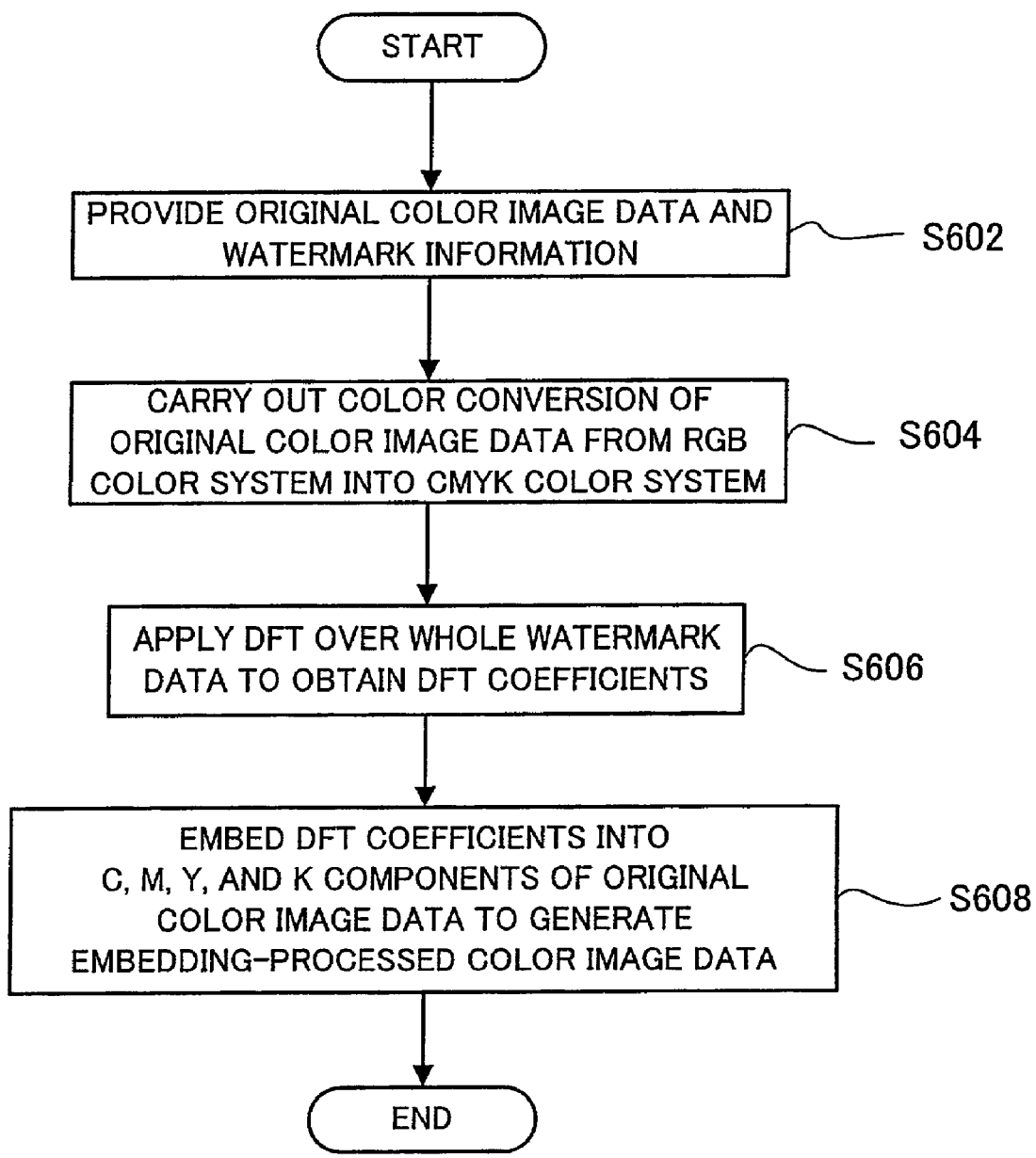

TECHNIQUE OF EMBEDDING AND DETECTING DIGITAL WATERMARK

BACKGROUND OF THE INVENTION

1. Field of the Invention

The present invention relates to a digital watermark processing technique applied to embed watermark information into digital data, such as image data and sound data.

2. Description of the Related Art

Information has been digitized with advancement of computer networks like the Internet and enables many users to readily access required information. Such technological innovation, however, causes copyrighted digital contents to be readily duplicated without any permission of the copyright holders. The problem of illegal copies and resulting copyright infringement has been significantly noticeable. With a view to preventing copyright infringement of sounds and images, which are primary information of the digital contents, digital watermark techniques have been developed to embed watermark information, such as copyright information, into sound data and image data.

One of the digital watermark techniques carries out frequency transformation (orthogonal transformation) of image data and sound data and embeds watermark information into resulting transform coefficients. The conventional digital watermark technique divides data into multiple blocks and applies frequency transformation onto each block. In the course of extraction of the embedded watermark information, this technique requires correction of the position and the shape of the data blocks. Especially when the data with the embedded watermark information is subjected to geometrical deformation, sophisticated matching process is required to correct the deviated position and the deformed shape of the data blocks due to the geometrical deformation.

SUMMARY OF THE INVENTION

The object of the present invention is thus to provide a digital watermark processing technique that does not require any correction of the position or the shape of image blocks in the process of extracting embedded watermark information.

At least part of the above and the other related objects is attained by a first digital watermark embedding method that embeds watermark information into digital data. The first digital watermark embedding method includes the steps of: (a) providing the watermark information and object data as an object of embedding the watermark information; (b) applying a predetermined orthogonal transformation over the whole object data to obtain transform coefficients; (c) embedding the watermark information into the transform coefficients; and (d) applying an inverse transform of the orthogonal transformation onto the transform coefficients with the watermark information embedded therein, so as to generate embedding-processed object data.

The first digital watermark embedding method of the present invention applies a predetermined orthogonal transformation over whole object data to obtain transform coefficients, embeds watermark information into the transform coefficients, and applies an inverse transform of the predetermined orthogonal transformation onto the embedding-processed transform coefficients, so as to generate embedding-processed object data.

The first digital watermark embedding method of the present invention applies the orthogonal transformation over the whole object data without dividing the object data into multiple blocks. This arrangement does not require any correction of the position or the shape of the blocks, which is required in the prior art technique in the course of extracting the embedded watermark information. Even when the embedding-processed object data with the watermark information embedded therein is subjected to certain deformation through digital-to-analog conversion and analog-to-digital reconversion, the technique of the present invention does not require any sophisticated matching process to correct the deviated position and the deformed shape of image blocks due to such deformation, thus ensuring simple extraction of the embedded watermark information.

In the case of image data specified as the object data, for example, printing an image with embedded watermark information by a printer corresponds to digital-to-analog conversion, and taking in a printed image with a scanner corresponds to analog-to-digital reconversion. Even when the resulting image data is subjected to geometrical deformation, the technique of the present invention does not require any sophisticated matching process to correct the deviated position and the deformed shape of image blocks due to such deformation.

The first digital watermark embedding method of the present invention applies the orthogonal transformation over the whole object data without dividing the object data into multiple blocks, and then embeds the watermark information into the resulting transform coefficients. Compared with the prior art technique of dividing the object data into multiple blocks, this procedure advantageously ensures homogeneous dispersion of the embedded watermark information in the whole object data.

In the first digital watermark embedding method of the present invention, it is preferable that the step (c) embeds the watermark information into transform coefficients of an intermediate frequency component among the obtained transform coefficients.

In this application, the intermediate frequency domain is a target embedding area. Such setting of the target embedding area effectively prevents extinction of the watermark information under application of scaling (described later) on the embedding-processed object data with the watermark information embedded therein, while preventing separation of the watermark information under application of sharing.

In accordance with one preferable application of the first digital watermark embedding method of the present invention, the predetermined orthogonal transformation is two-dimensional discrete cosine transform when the object data consists of two-dimensional discrete values. The step (c) embeds the watermark information into transform coefficients located on a straight line extending from a direct current component toward a high frequency domain on a two-dimensional plane, among the transform coefficients obtained in the step (b) as two-dimensional transform coefficients.

This application effectively eliminates interactions of a discrete cosine transform component with a discrete sine transform component under application of rotation (described later) on the embedding-processed object data with the watermark information embedded therein.

In accordance with another preferable application of the first digital watermark embedding method of the present invention, the predetermined orthogonal transformation is two-dimensional discrete Fourier transform when the object data consists of two-dimensional discrete values. The step (c) embeds the watermark information into transform coefficients located on a concentric circle about a direct current component on a two-dimensional plane, among the transform coefficients obtained in the step (b) as two-dimensional transform coefficients.

This application desirably restricts the range of presence of the watermark information on the circumference of the concentric circle under application of the rotation on the embedding-processed object data with the watermark information embedded therein. This effectively enhances the extraction efficiency.

The present invention is also directed to a second digital watermark embedding method that embeds watermark information into digital data. The second digital watermark embedding method includes the steps of: (a) providing watermark data representing the watermark information and object data as an object of embedding the watermark information; (b) applying a predetermined orthogonal transformation over the whole watermark data to obtain transform coefficients; and (c) embedding the transform coefficients into the object data, so as to generate embedding-processed object data.

The second digital watermark embedding method of the present invention applies a predetermined orthogonal transformation over whole watermark data representing watermark information to obtain transform coefficients, and embeds the transform coefficients into object data, so as to generate embedding-processed object data.

Namely the second digital watermark embedding method of the present invention does not apply the orthogonal transformation onto the object data, but applies the orthogonal transformation onto the watermark data representing the watermark information and then embeds the resulting transform coefficients into the object data. Compared with the method of applying the orthogonal transformation onto the object data, this method does not require any inverse transform of the orthogonal transformation and thus significantly shortens the processing time. Application of the orthogonal transformation onto the watermark data attains the shorter processing time than that in the case of application onto the object data, since the quantity of the watermark data is less than the quantity of the object data.

The second digital watermark embedding method of the present invention applies the orthogonal transformation over the whole watermark data without dividing the watermark data into multiple blocks. This arrangement does not require any correction of the position or the shape of the blocks, which is required in the prior art technique in the course of extracting the embedded watermark information. Even when the embedding-processed object data with the watermark information embedded therein is subjected to certain deformation through digital-to-analog conversion and analog-to-digital reconversion, the technique of the present invention does not require any sophisticated matching process to correct the deviated position and the deformed shape of image blocks due to such deformation, thus ensuring simple extraction of the embedded watermark information. In the case of image data specified as the object data, for example, even when the resulting image data is subjected to geometrical deformation through the process of printing an image with embedded watermark information with a printer and taking in the printed image with a scanner, the technique of the present invention does not require any sophisticated matching process to correct the deviated position and the deformed shape of image blocks due to such deformation.

The second digital watermark embedding method of the present invention applies the orthogonal transformation over the whole watermark data without dividing the watermark data into multiple blocks, and then embeds the resulting transform coefficients into the object data. Compared with the prior art technique of dividing the watermark data into multiple blocks, this procedure advantageously ensures homogeneous dispersion of the embedded watermark information in the whole object data.

In the second digital watermark embedding method of the present invention, the step (c) embeds transform coefficients of an intermediate frequency component among the obtained transform coefficients into the object data.

In this application, the intermediate frequency domain is a target embedding area. Such setting of the target embedding area effectively prevents extinction of the watermark information under application of scaling on the embedding-processed object data with the watermark information embedded therein, while preventing separation of the watermark information under application of sharing.

In accordance with one preferable application of the second digital watermark embedding method of the present invention, the predetermined orthogonal transformation is two-dimensional discrete cosine transform when the object data consists of two-dimensional discrete values. The step (c) embeds transform coefficients located on a straight line extending from a direct current component toward a high frequency domain on a two-dimensional plane, among the transform coefficients obtained in the step (b) as two-dimensional transform coefficients, into the object data.

This application effectively eliminates interactions of a discrete cosine transform component with a discrete sine transform component under application of rotation on the embedding-processed object data with the watermark information embedded therein.

In accordance with another preferable application of the second digital watermark embedding method of the present invention, the predetermined orthogonal transformation is two-dimensional discrete Fourier transform when the object data consists of two-dimensional discrete values. The step (c) embeds transform coefficients located on a concentric circle about a direct current component on a two-dimensional plane, among the transform coefficients obtained in the step (b) as two-dimensional transform coefficients, into the object data.

This application desirably restricts the range of presence of the watermark information on the circumference of the concentric circle under application of the rotation on the embedding-processed object data with the watermark information embedded therein. This effectively enhances the extraction efficiency.

In either of the first and the second digital watermark embedding methods of the present invention, the predetermined orthogonal transformation is preferably discrete cosine transform.

The discrete cosine transform is frequently used in the field of signal processing. Non-correlation of data by the discrete cosine transform brings good results, especially for image and sound encoding and compression in the field of signal processing. The discrete cosine transform has extensively been studied with regard to both software and hardware.

In either of the first and the second digital watermark embedding methods of the present invention, the predetermined orthogonal transformation is preferably discrete Fourier transform.

The discrete Fourier transform is especially applied for image and sound analysis in the field of signal processing. The discrete Fourier transform has been studied extensively, for example, high-speed calculation.

The present invention is further directed to a digital watermark extraction method that extracts watermark information from digital data with the watermark information embedded therein. The digital watermark extraction method includes the steps of: (a) providing embedding-processed object data with the watermark information embedded therein; (b) applying a predetermined orthogonal transformation over the whole embedding-processed object data to obtain transform coefficients; and (c) extracting the embedded watermark information from the transform coefficients.

The digital watermark extraction method of the present invention applies the predetermined orthogonal transformation over the whole embedding-processed object data to obtain transform coefficients, and extracts the embedded watermark information from the transform coefficients.

The digital watermark extraction method of the present invention ensures simple extraction of the watermark information, which has been embedded according to the digital watermark embedding method of the present invention described above, from the embedding-processed object data.

The present invention is not limited to the digital watermark embedding method or the digital watermark extraction method discussed above. Other possible applications of the present invention include a digital watermark processing apparatus, computer programs for actualizing such methods and apparatus, recording media in which such computer programs are recorded, and data signals including such computer programs and being embodied in carrier signals.

BRIEF DESCRIPTION OF THE DRAWINGS

FIG. 9 shows an example of processing environment;

FIG. 35 is a flowchart showing a digital watermark embedding routine executed by the color conversion module, the DFT module, and the embedding module, corresponding to the fourth embodiment.

DESCRIPTION OF THE PREFERRED EMBODIMENTS

Some modes of carrying out the invention are discussed below as preferred embodiments in the following sequence:

A. First Embodiment
  A-1. Process of Embedding Digital Watermark
  A-2. Process of Detecting Digital Watermark
  A-3. Concrete Example B. Second Embodiment
  B-1. Process of Embedding Digital Watermark
  B-2. Process of Detecting Digital Watermark
  B-3. Concrete Example C. Third Embodiment
  C-1. Process of Embedding Digital Watermark
  C-2. Process of Extracting Digital Watermark D. Fourth Embodiment
  D-1. Process of Embedding Digital Watermark
  D-2. Process of Extracting Digital Watermark E. General Construction of Apparatus and Processing Routines F. Modifications
  F-1. Modified Example 1
  F-2. Modified Example 2
  F-3. Modified Example 3
  F-4. Modified Example 4
  F-5. Modified Example 5
  F-6. Modified Example 6
  F-7. Modified Example 7
  F-8. Modified Example 8
  F-9. Modified Example 9

A. First Embodiment

The following describes a first embodiment of the present invention, where discrete cosine transform (DCT) is applied for orthogonal transformation (or frequency transformation) and color image data is an object of embedding watermark information.

A-1. Process of Embedding Digital Watermark

Figure 1:
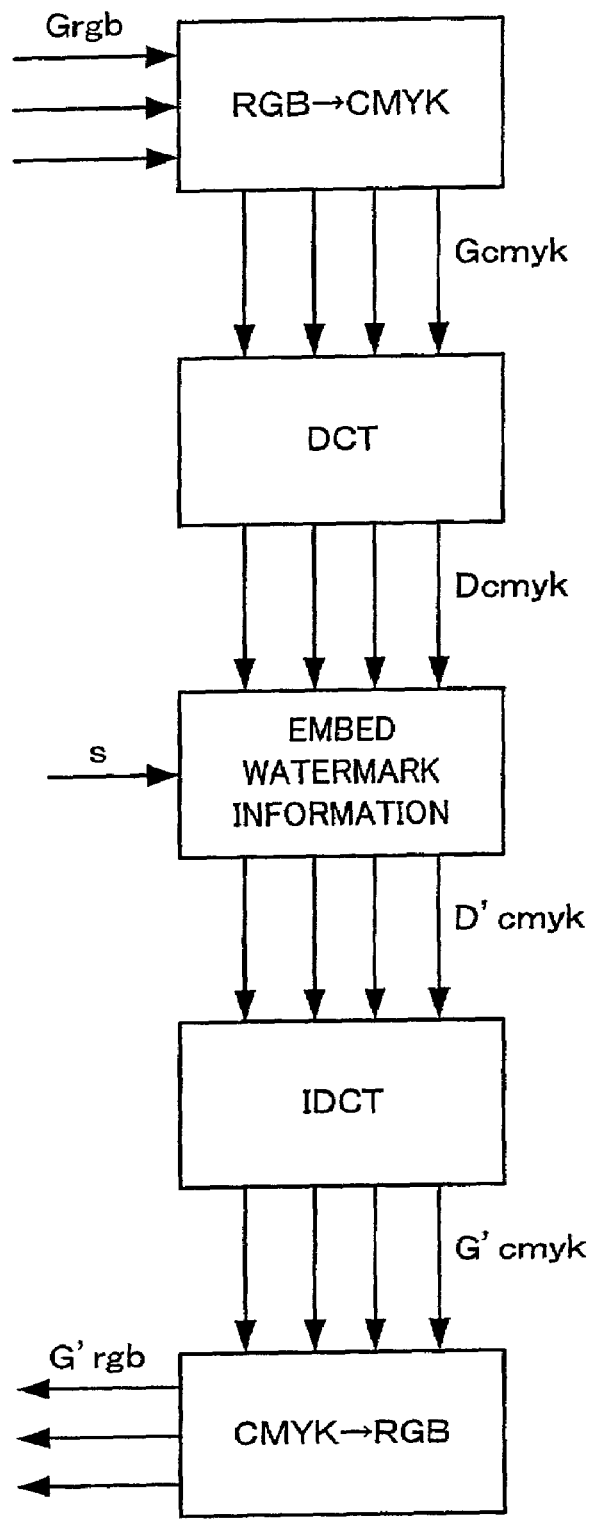
FIG. 1 shows the outline of a process of embedding a digital watermark in a first embodiment of the present invention.

FIG. 1 shows the outline of a process of embedding a digital watermark in the first embodiment of the present invention.

The process first provides original color image data $G_{rgb}$ as an object of embedding watermark information and watermark information s to be embedded. In this embodiment, the original color image data $G_{rgb}$ is expressed by an RGB (red, green, blue) color system and has a size of M×N pixels and color of each pixel expressed by R (red), G (green), and B (blue) components. The watermark information s is a bit string s[p] (p=0, 1, ..., P−1) having a bit length P. The bit string s[p] takes either a value '0' or a value '1'.

The process subsequently converts the original color image data $G_{rgb}$ from the RGB color system into a CMYK (cyan, magenta, yellow, black) color system and obtains color-converted original color image data $G_{cmyk}$. The color-converted original color image data $G_{cmyk}$ has a size of M×N pixels and color of each pixel expressed by C (cyan), M (magenta), Y (yellow), and K (black) components.

The process then makes the whole color-converted original color image data $G_{cmyk}$ subjected to discrete cosine transform (DCT) as an orthogonal transformation and gains DCT coefficients $D_{cmyk}$ as frequency components (transform coefficients).

The prior art technique divides an image into multiple blocks and applies the DCT in each block. The technique of this embodiment, on the other hand, applies the DCT over the whole image without dividing the image into multiple blocks.

Two-dimensional DCT is applicable for two-dimensional discrete values like image data as expressed by Equation 1.

$$D(u, v) = c(u)c(v) \frac{2}{\sqrt{MN}} \sum_{m=0}^{M-1} \sum_{n=0}^{N-1} G(m, n) \cos\frac{(2m+1)u\pi}{2M} \cos\frac{(2n+1)v\pi}{2N} \quad (1)$$

$$u = 0, 1, \ldots, M-1 \quad v = 0, 1, \ldots, N-1$$

$$c(u)c(v) = \begin{cases} 1/\sqrt{2} & u, v = 0 \\ 1 & u, v \neq 0 \end{cases}$$

Here G(m,n) denotes image data, and D(u,v) denotes DCT coefficients.

The two-dimensional DCT over the whole image advantageously ensures homogeneous dispersion of the applied operation in the whole image.

Figure 2:
FIG. 2 shows application of two-dimensional DCT onto color image data.
Figure 2:
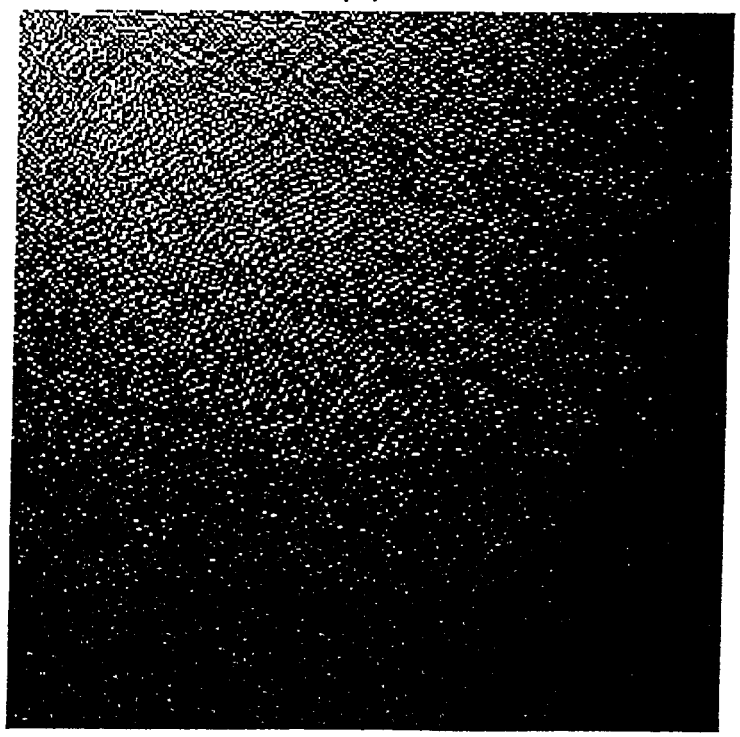
Figure 3:
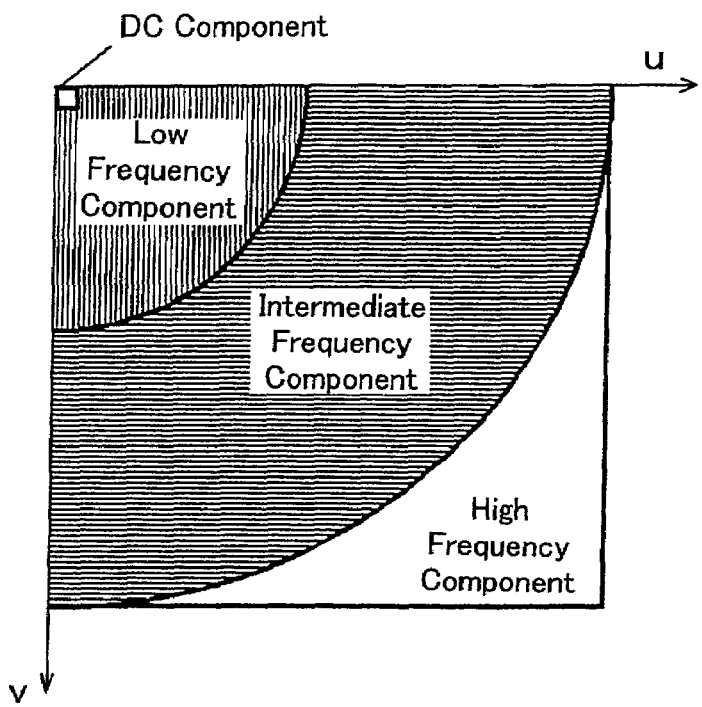
FIG. 3 shows a distribution of frequency components obtained by the two-dimensional DCT.

Application of the two-dimensional DCT on the color image data causes frequency decomposition of the color image data as shown in FIG. 2. FIG. 2(a) shows an original image, and FIG. 2(b) shows frequency components (DCT coefficients). A low frequency component among the frequency components defines a rough outline of an image, while higher frequency components define the details of the image. The upper-most component is called a direct current (DC) component and defines the total quantity of energy.

The process subsequently embeds the watermark information s into the respective color components C, M, Y, and K of the DCT coefficients $D_{cmyk}$ according to a desired embedding algorithm.

Figure 4:
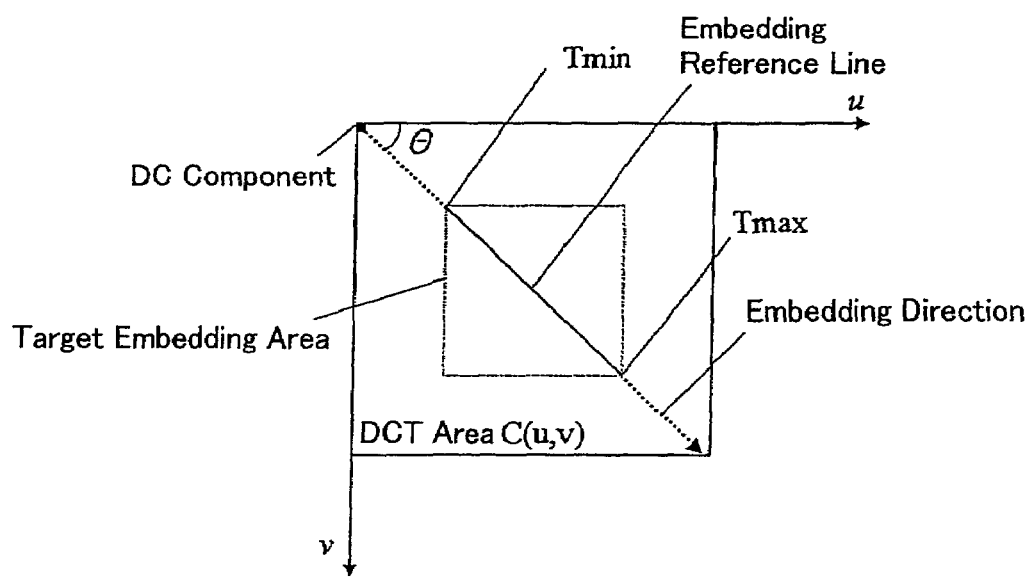
FIG. 4 shows an embedding reference line and a target embedding area on DCT coordinates.
Figure 5:
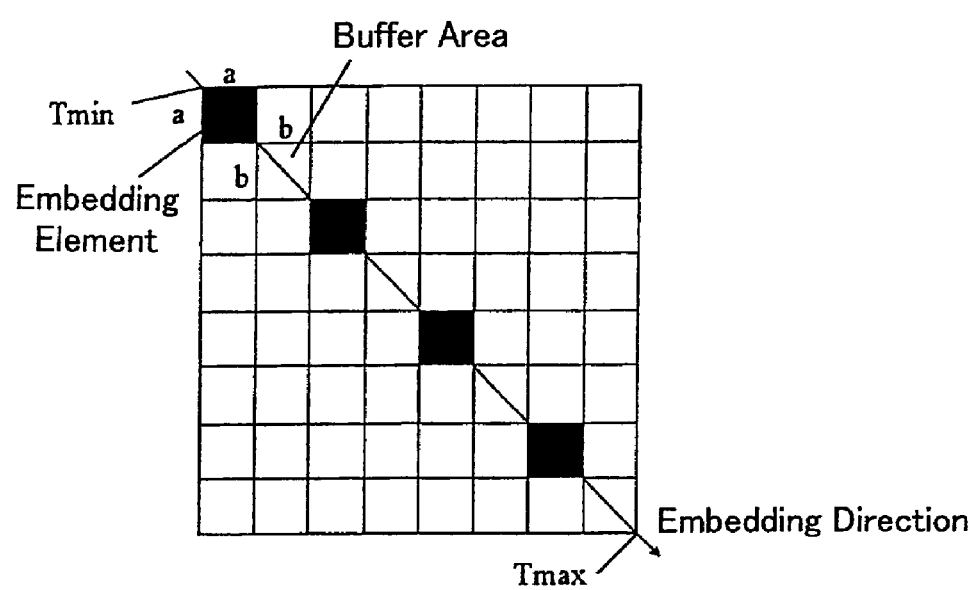
FIG. 5 shows embedding elements and buffer areas in the target embedding area.

The concrete procedure first assumes DCT coordinates (u,v) shown in FIG. 4 to specify a frequency band used for embedding the watermark information s. The procedure then sets a minimum embedding frequency Tmin and a maximum embedding frequency Tmax and specifies a target embedding area on the basis of a straight line (embedding reference line) extending from the DC component in a direction of an angle θ (embedding direction) relative to the u axis. The procedure regards the DCT coefficients in a predetermined element range a as one element as shown in FIG. 5. The embedding element accordingly has a fixed range. In order to prevent interference of adjacent embedding elements, the procedure sets a buffer area of a predetermined element interval b between the adjacent embedding elements. A value $V_0$ is to be embedded according to the watermark information s when the value of s[p] is equal to 0, and a value $V_1$ when the value of s[p] is equal to 1.

After specifying the embedding elements for digital watermark, the procedure embeds the watermark information s[p] into the respective color components C, M, Y, and K of the DCT coefficients $D_{cmyk}$ according to an algorithm given below.

Step 1: sets a value '0' to a watermark pointer $E_h$ ($E_h$=0);

Step 2: sets the direction of the angle θ from the DC component relative to the u axis as the embedding direction;

Step 3: sets a rectangular area of Tmin and Tmax as vertexes as a target embedding area;

Step 4: specifies an intersection of the straight line (embedding reference line) extending from the DC component in the embedding direction and the target embedding area as a point H;

Step 5: sets a distance a both in the u and v directions from the point H as a starting point, and respectively embeds the value $V_0$ and the value $V_1$ with the mark of the original DCT coefficients into the DCT coefficients in the defined range when x[$E_h$ mod P]=0 and x[$E_h$ mod P]=1;

Step 6: increments the watermark pointer as $E_h$=$E_h$+1, and shifts the point H by a distance 'a+b' in the embedding direction; and Step 7: repeats steps 5 and 6 until the point P exceeds Tmax.

The bit string s[p] as the watermark information is embedded along the embedding reference line according to the above algorithm.

Referring back to FIG. 1, the process makes resulting DCT coefficients D'$_{cmyk}$ with the embedded watermark information s subjected to inverse discrete cosine transform (IDCT) to generate embedding-processed color image data G'$_{cmyk}$. The process then carries out color conversion of the color image data G'$_{cmyk}$ from the CMYK color system into the RGB color system to obtain embedding-processed color image data G'$_{rgb}$.

As described above, the digital watermark embedding method of this embodiment applies the DCT over the whole image without dividing the image into multiple blocks, and then embeds the watermark information into the resulting DCT coefficients. Compared with the prior art technique of dividing the image into multiple blocks, this procedure advantageously ensures homogeneous dispersion of the embedded watermark information in the whole image.

Unlike the prior art technique, the digital watermark embedding method of this embodiment does not require correction of the position and the shape of the image blocks in the course of extracting the embedded watermark information. In the process of printing an image with embedded watermark information by a printer and taking in the printed image with a scanner (hereinafter this process is referred to as printing and intake process), geometrical deformation is applied to the resulting image data. The technique of this embodiment, however, does not require any sophisticated matching process to correct the deviated position and the deformed shape of the image blocks due to such geometrical deformation, thus ensuring simple extraction of the embedded watermark information. In the printing and intake process, the step of printing the image with the embedded watermark information by the printer may be regarded as digital-to-analog conversion of embedding-processed color image. The step of taking in the printed image with the scanner may be regarded as analog-to-digital conversion.

The geometrical deformation is ascribed to four basic geometrical transforms, trimming, scaling, sharing, and rotation. Trimming cuts off part of the image or gives a margin to the image, while not changing the scale of the image. Scaling changes the resolution of the image simultaneously with the size of the image. Sharing inclines only one axis, while not changing the resolution of the image. Rotation inclines two axes, that is, rotates, while not changing the resolution of the image. The following effects are expected by application of such geometrical transforms onto the image with the watermark information embedded by the DCT. Trimming of the image scales down the DCT components and thereby the embedded watermark information. This contracts the embedded watermark information and may cause difficulties in extraction of the watermark information. Scaling of the image trims the DCT components and thereby the embedding watermark information. This may eliminate the high frequency component of the embedded watermark information. Under the application of trimming, the effects of adjoining areas may make it difficult to detect the outer edge of the frequency. Sharing of the image trims the DCT component in the direction of a processed axis and splits the DCT components in the direction of a non-processed axis. The higher frequency on the processed axis has the greater degree of split. Namely the embedded watermark information is subjected to the greater degree of separation at the higher frequency component on each axis. Rotation of the image rotates the DCT components about the DC component on the basis and splits the DCT components and DST (discrete sine transform) components in the opposite directions. The embedded watermark information may thus be rotated about the DC component and separated.

In the digital watermark embedding method of this embodiment, on the other hand, the target embedding area is only the intermediate frequency area between the minimum embedding frequency Tmin and the maximum embedding frequency Tmax as shown in FIG. 4. Such setting of the target embedding area effectively prevents extinction of the watermark information under the application of scaling, while preventing separation of the watermark information under the application of sharing. Since the predetermined frequency range is treated as one embedding element, there is no difficulty in extracting the embedded watermark information even under the application of trimming, which may contract the watermark information. As the watermark information is embedded linearly from the DC component toward the higher frequencies, interactions of the DCT components with the DST components are eliminated under the application of rotation.

The printing and intake process changes the hue, in addition to the geometrical transforms described above. The digital watermark embedding method of this embodiment embeds the watermark information after color conversion of the color image data from the RGB color system into the CMYK color system. This arrangement ensures less variation in contrast and thereby practically no change of the hue in the pixels through the printing and intake process, thus facilitating extraction of the watermark information. In the course of color conversion from the RGB color system into the CMYK color system, the K (black) component is separated as the base component of each pixel, whereas the values of the remaining components C(cyan), M (magenta), and Y (yellow) express the relative color balance in each pixel. The overall difference in contrast is accordingly absorbed by the K component, and the difference in contrast is eliminated from the remaining components C, M, and Y.

The printing and intake process often leads to a blurred color area, ink blotting, and an error due to re-sampling. This may make the whole image blurred and lower the clearness of the frequency components compared with the original signal, thereby causing interference of adjoining pieces of the watermark information. The digital watermark embedding method of this embodiment, however, sets the buffer area between the adjacent embedding elements as shown in FIG. 5, thus effectively preventing the potential interference of the watermark information.

A-2. Process of Detecting Digital Watermark

Figure 6:
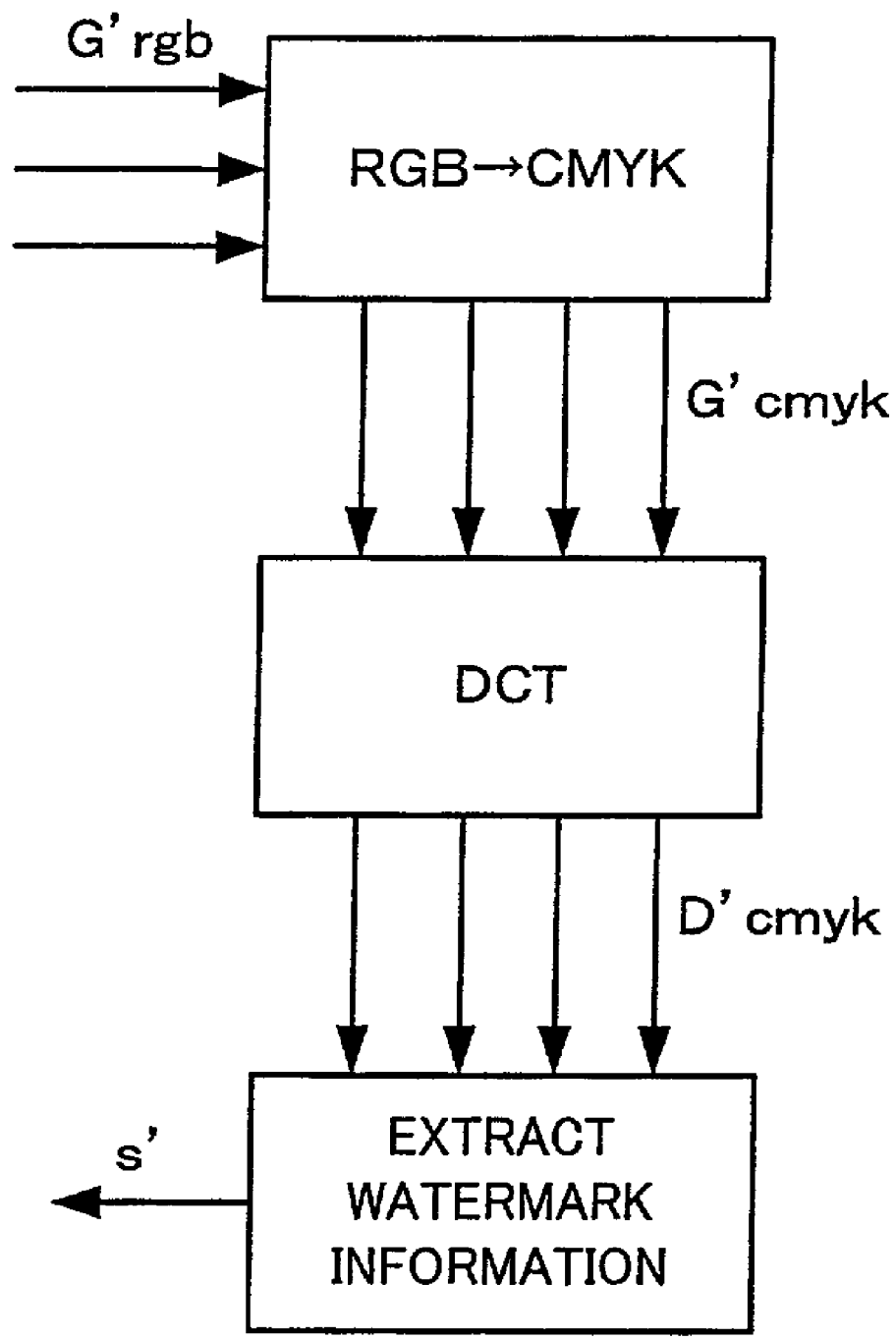
FIG. 6 shows the outline of a process of detecting the digital watermark in the first embodiment of the present invention.

FIG. 6 shows the outline of a process of detecting the digital watermark in the first embodiment of the present invention.

The process first provides the embedding-processed color image data G'$_{rgb}$, which has been generated by the digital watermark embedding process shown in FIG. 1.

The process then carries out color conversion of the embedding-processed color image data G'$_{rgb}$ from the RGB color system into the CMYK color system to generate embedding-processed color image data G'$_{cmyk}$.

The process subsequently applies the DCT over the whole embedding-processed color image data $G'_{cmyk}$ to obtain embedding-processed DCT coefficients $D'_{cmyk}$.

In the same manner as the digital watermark embedding process, the digital watermark extraction process applies the two-dimensional DCT over the whole image without dividing the image into multiple blocks.

The process then extracts embedded watermark information s' from the color components C, M, Y, and K of the embedding-processed DCT coefficients $D'_{cmyk}$ according to a desired extraction algorithm.

The concrete procedure provides the element range a, the element interval b (that is, the range of the buffer area), the angle θ in the embedding direction, the minimum embedding frequency Tmin, and the maximum embedding frequency Tmax, which have been used in the process of embedding the watermark information s. The procedure then extracts the embedded watermark information s' from the color components C, M, Y, and K of the embedding-processed DCT coefficients $D'_{cmyk}$ according to an algorithm given below.

Figure 7:
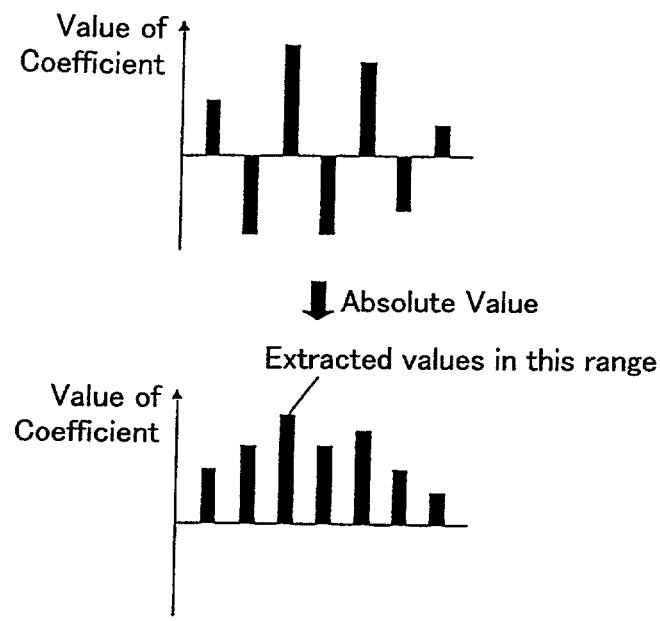
FIG. 7 shows extraction of watermark information s' (extracted value) from DCT coefficients in an extraction element.

Step 1: sets a value '0' to a watermark pointer $E_h$ ($E_h=0$);

Step 2: sets the direction of the angle θ from the DC component relative to the u axis as an extraction direction;

Step 3: sets a rectangular area of Tmin and Tmax as vertexes as a target extraction area;

Step 4: specifies an intersection of a straight line (extraction reference line) extending from the DC component in the extraction direction and the target extraction area as a point H;

Step 5: sets a distance a both in the u and v directions from the point H as a starting point, determines absolute values of the embedding-processed DCT coefficients in the defined range (extraction element) as shown in FIG. 7, and extracts the maximum absolute value as the embedded watermark information s' (extracted value);

Step 6: increments the watermark pointer as $E_h=E_h+1$, and shifts the point H by a distance 'a+b' in the extraction direction; and Step 7: repeats steps 5 and 6 until the point P exceeds Tmax.

Figure 8:
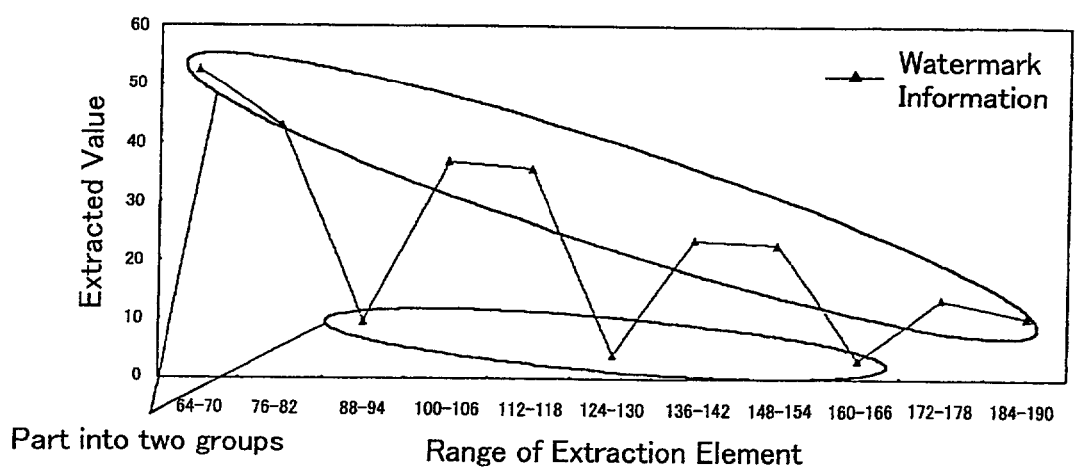
FIG. 8 is a graph showing a plot of the extracted value against the range of extraction element.

The watermark information s' is successively extracted according to the above algorithm. FIG. 8 shows a plot of the successively extracted watermark information s' against the range of the extraction element (this corresponds to the embedding element). As clearly seen in FIG. 8, the extracted values are parted into two groups. The distribution of these two groups depends upon the values $V_0$ and $V_1$ set in the process of embedding the watermark information s. Setting the adequate values to $V_0$ and $V_1$ thus ensures accurate discrimination of these two groups by a specific threshold value.

A-3. Concrete Example

The following describes results of extraction of watermark information from image data, which has watermark information embedded by the DCT and has undergone the printing and intake process.

Figures 10, 11:
FIG. 10 shows an example of original color image data as an object of embedding watermark information.
FIG. 11 shows results of extraction of watermark information from watermark information-embedded image data, which has undergone a printing and intake process.

The processing environment used here was specified in FIG. 9. The original color image data as the object of embedding the watermark information was an SIDBA standard image Lena shown in FIG. 10. The size of the original color image data was 256×256 pixels. The target embedding area was the intermediate frequency area between Tmin= (64,64) and Tmax=(192,192). The angle θ in the embedding direction was 45 degrees, and the bit string as the watermark information was s=1,1,0. FIG. 11 shows results of extraction when $V_0$ was fixed to the value '0' while $V_1$, a, and b were varied. In the table of FIG. 11, the extraction rate is obtained in discrimination by the threshold value, and the extraction rate of the CMYK component corresponds to a mean of the extracted values of the respective color components.

Figure 12:
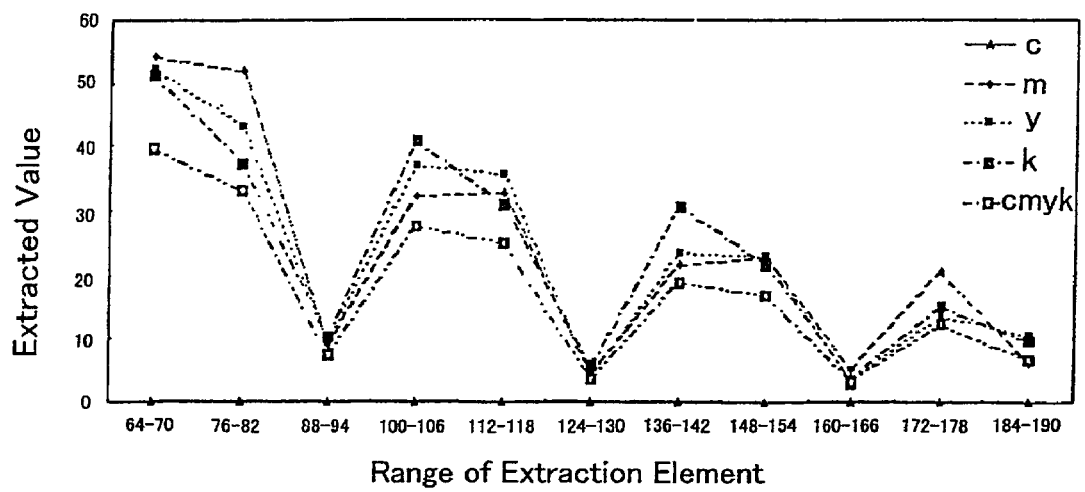
FIG. 12 is a graph showing plots of the extracted value against the range of extraction element with regard to respective color components.

The results show that the component C has the lower extraction rate. This is ascribed to the low ratio of the component C in the whole image and the small dispersion of the component C in the case of separation of the component K. FIG. 12 shows the extracted values of the coefficient. This graph clearly shows that the printing and intake process of an image with an identical embedded coefficient value causes the higher frequency component of the smaller dispersion to have the lower embedded coefficient value. The component C originally having the small dispersion is thus remarkably affected by the printing and intake process.

The narrower range a of the embedding element and the lower value $V_1$ results in the lower extraction rate. The extraction rate may be lowered by the geometrical effects of the printing and intake process and by the diffusion of adjacent coefficients due to the varied contrast.

Figure 13:
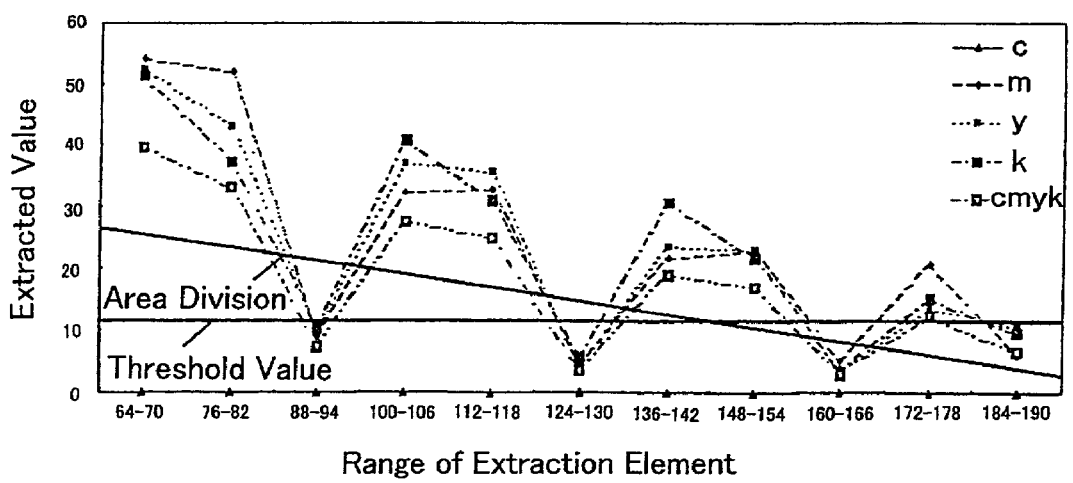
FIG. 13 shows discrimination by area division, which is adopted when there is a difficulty in discrimination by a threshold value.

When there is a difficulty in discrimination by the threshold value, the graph is divided into two areas for the enhanced extraction rate as shown in FIG. 13.

B. Second Embodiment

The following describes a second embodiment of the present invention, where discrete Fourier transform (DFT) is applied for orthogonal transformation (or frequency transformation) and color image data is an object of embedding watermark information.

B-1. Process of Embedding Digital Watermark

Figure 14:
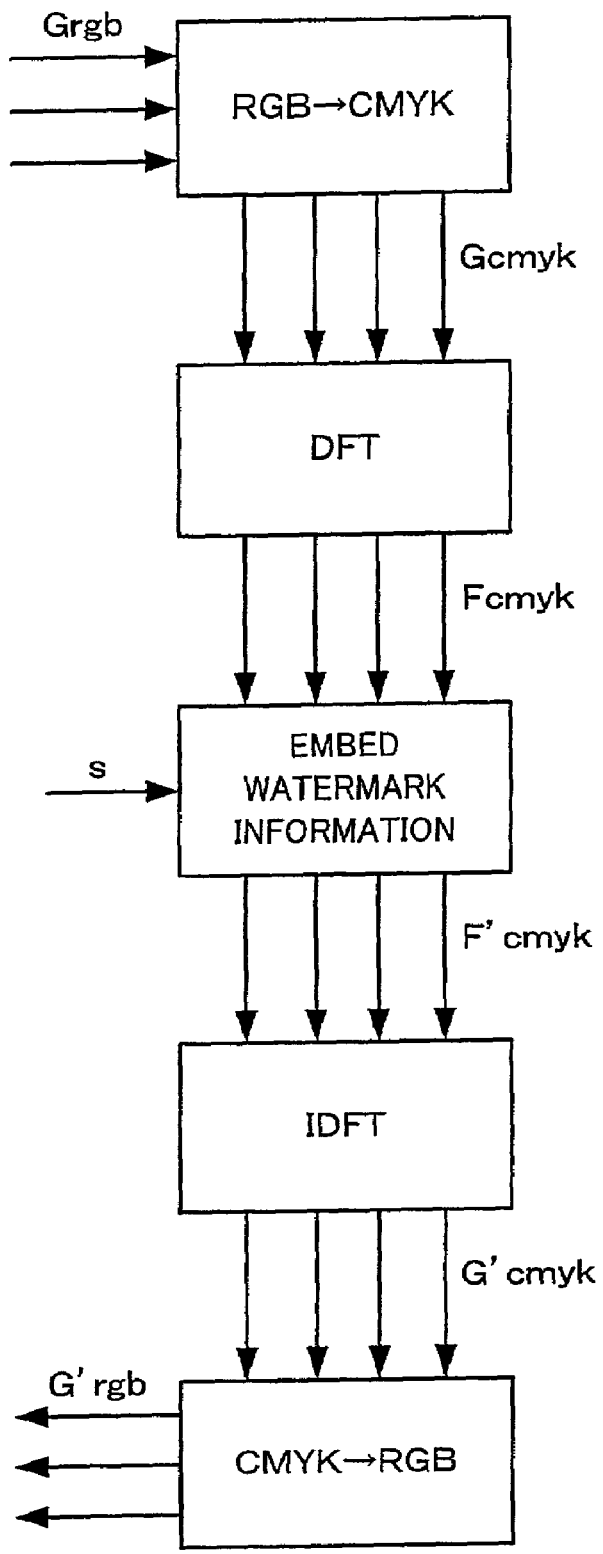
FIG. 14 shows the outline of a process of embedding a digital watermark in a second embodiment of the present invention.

FIG. 14 shows the outline of a process of embedding a digital watermark in the second embodiment of the present invention.

The process first provides original color image data $G_{rgb}$ as an object of embedding watermark information and watermark information s to be embedded. Like the first embodiment, in the second embodiment, the original color image data $G_{rgb}$ is expressed by the RGB color system and has the size of M×N pixels and color of each pixel expressed by the components R, G, and B. The watermark information s is the bit string s[p] (p=0, 1, ..., P-1) having the bit length P. The bit string s[p] takes either the value '0' or the value '1'.

The process subsequently converts the original color image data $G_{rgb}$ from the RGB color system into the CMYK color system and obtains color-converted original color image data $G_{cmyk}$. The color-converted original color image data $G_{cmyk}$ has the size of M×N pixels and color of each pixel expressed by the components C, M, Y, and K.

The process then makes the whole color-converted original color image data $G_{cmyk}$ subjected to discrete Fourier transform (DFT) as an orthogonal transformation and gains DFT coefficients $F_{cmyk}$ as frequency components (transform coefficients).

The prior art technique divides an image into multiple blocks and applies the DFT in each block. Like the first embodiment, the technique of this embodiment, on the other hand, applies the DFT over the whole image without dividing the image into multiple blocks.

Two-dimensional DFT is applicable for two-dimensional discrete values like image data as expressed by Equation 2.

$$F(u, v) = \sum_{m=0}^{M-1}\sum_{n=0}^{N-1} G(m, n)\exp\left[-j2\pi\left(\frac{mu}{M} + \frac{nv}{N}\right)\right] \quad (2)$$

$$u = 0, 1, \ldots, M-1 \quad v = 0, 1, \ldots, N-1$$

Here G(m,n) denotes image data, and F(u,v) denotes DFT coefficients.

The two-dimensional DFT over the whole image advantageously enables the applied operation onto the part of the frequency components to be homogeneously dispersed in the whole image.

Unlike the DCT, the DFT is expressed by a function of complex variable. There are two expression methods: expression by a real number component and an imaginary number component and expression by an amplitude component and a phase component. Either of the expressions is symmetrical about a minimum frequency component, so that application of a certain operation on a specific DFT component requires application of the same operation on its symmetrical component. The amplitude-phase expression well represents the characteristics of an original signal; the amplitude component mainly specifies the shape of an image and the phase component mainly specifies the position of the waveform defined by the amplitude component. The amplitude-phase expression is thus often used in the field of signal analyses and digital watermarking.

Figure 15:
FIG. 15 shows application of two-dimensional DFT onto color image data.
Figure 15:
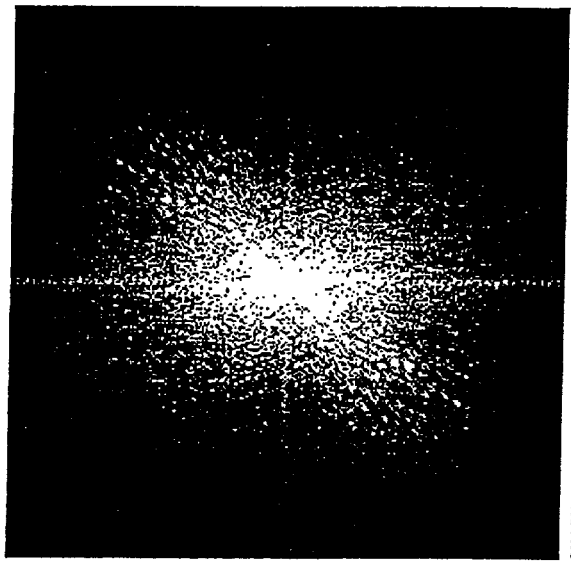
Figure 15:
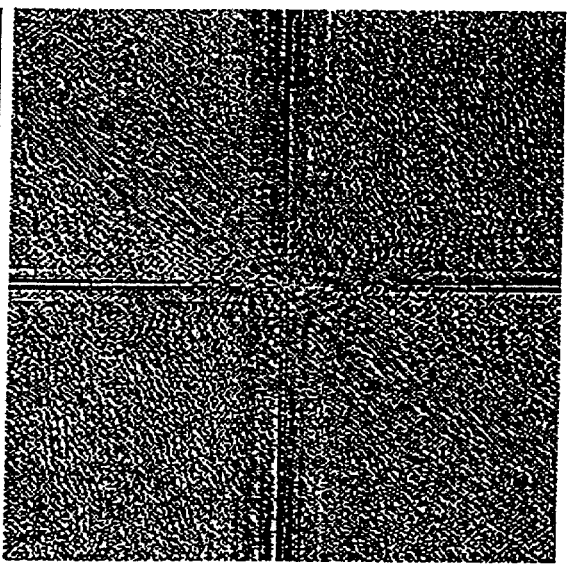
Figure 16:
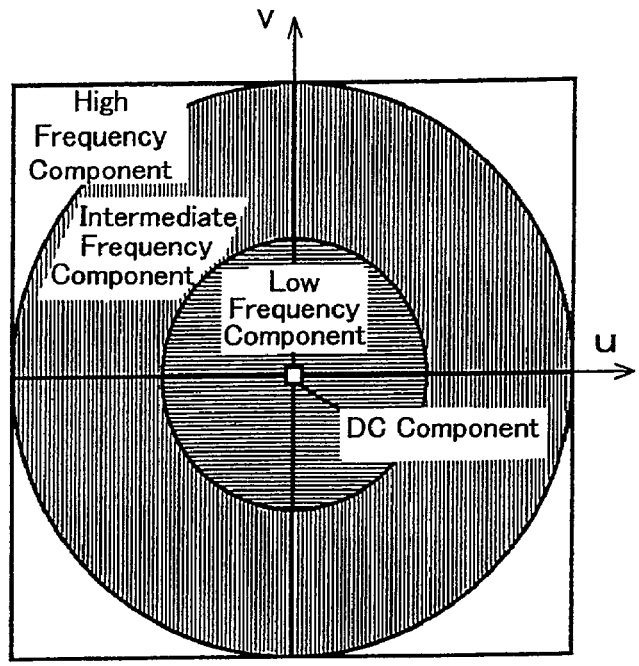
FIG. 16 shows a frequency distribution of an amplitude component obtained by the two-dimensional DFT.

An example of the amplitude-phase expression of the color image data, which has undergone the two-dimensional DFT, is given in FIG. 15. FIGS. 15(a), 15(b), and 15(c) respectively show an original image, an amplitude component, and a phase component. As shown in FIG. 16, a low frequency component out of the amplitude component defines the rough outline of an image, while higher frequency components define the details of the image. The contrast of the phase component is inverted with a phase shift of π and is deviated half with a phase shift of π/2. When the deviation varies at different frequencies, images of the respective frequency components are shifted by different degrees in an identical image plane. A special embedding technique should thus be applied to embed the watermark information in the phase component. The procedure of this embodiment accordingly does not embed the watermark information in the phase component, but embeds the watermark information in the amplitude component. In the discussion hereafter, the DFT components (DFT coefficients) thus represent the amplitude component.

Referring back to FIG. 14, the process subsequently embeds the watermark information s into the respective color components C, M, Y, and K of the DFT coefficients (amplitude component) $F_{cmyk}$ according to a desired embedding algorithm.

Figure 17:
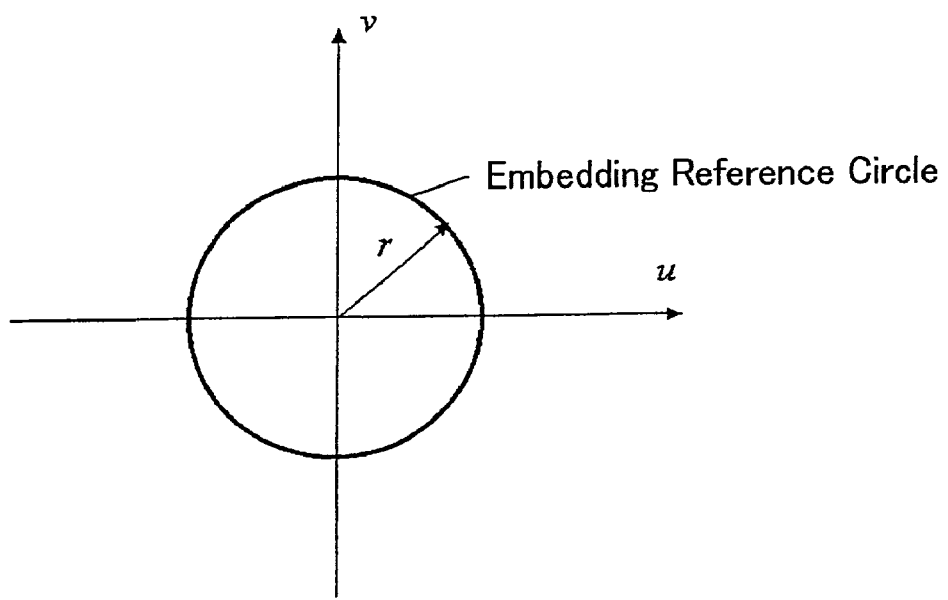
FIG. 17 shows an embedding reference circle on DFT coordinates.
Figure 18:
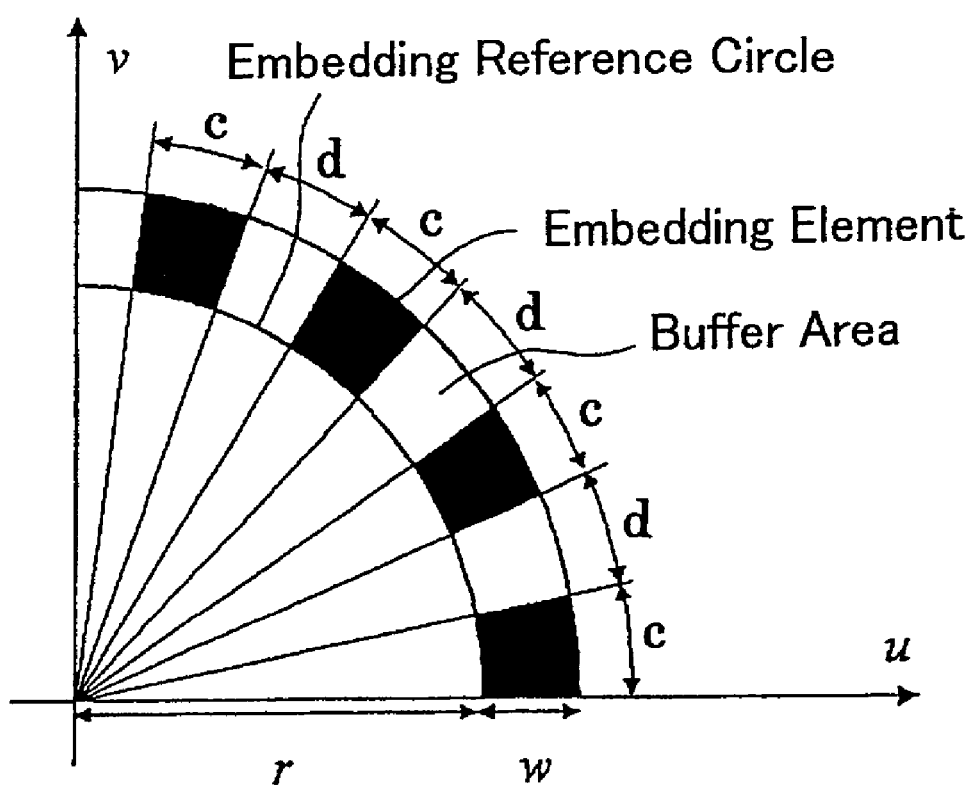
FIG. 18 shows embedding elements and buffer areas in the embedding reference circle.

The concrete procedure first assumes DFT coordinates (u,v) shown in FIG. 17 to specify a frequency band used for embedding the watermark information s. The procedure subsequently sets an embedding radius r and specifies a target embedding area on the basis of a circle (embedding reference circle) of the radius r from the DC component. The procedure regards the DFT coefficients in a predetermined range, which is defined by a predetermined element presence angle c and a predetermined embedding width (element width) w, as one element as shown in FIG. 18. The embedding element accordingly has a fixed range. In order to prevent interference of adjacent embedding elements, the procedure sets a buffer area of a predetermined inter-element angle d between the adjacent embedding elements. In the same manner as the first embodiment, the value $V_0$ is to be embedded according to the watermark information s when the value of s[p] is equal to 0, and the value $V_1$ when the value of s[p] is equal to 1.

After specifying the embedding elements for digital watermark, the procedure embeds the watermark information s[p] into the respective color components C, M, Y, and K of the DFT coefficients $F_{cmyk}$ according to an algorithm given below.

Step 1: sets a value '0' to a watermark pointer $E_h$ ($E_h$=0);

Step 2: respectively embeds the value $V_0$ and the value $V_1$ into the DFT coefficients in the range defined by the radius r and the radius r+w and between the angle $E_h$ and the angle $E_h$+c when x[$E_h$ mod P]=0 and x[$E_h$ mod P]=1;

Step 3: increments the watermark pointer as $E_h$=$E_h$+c+d; and

Step 4: repeats steps 2 and 3 until the watermark pointer $E_h$ exceeds 180 degrees.

The bit string s[p] as the watermark information is embedded along the embedding reference circle according to the above algorithm.

Referring back to FIG. 14, the process makes resulting DFT coefficients $F'_{cmyk}$ with the embedded watermark information s subjected to inverse discrete Fourier transform (IDFT) to generate embedding-processed color image data $G'_{cmyk}$. The process then carries out color conversion of the color image data $G'_{cmyk}$ from the CMYK color system into the RGB color system to obtain embedding-processed color image data $G'_{rgb}$.

As described above, in a similar manner to the first embodiment, the digital watermark embedding method of this embodiment applies the DFT over the whole image without dividing the image into multiple blocks, and then embeds the watermark information into the resulting DFT coefficients. Compared with the prior art technique of dividing the image into multiple blocks, this procedure advantageously ensures homogeneous dispersion of the embedded watermark information in the whole image.

Like the first embodiment, the digital watermark embedding method of this embodiment does not require correction of the position and the shape of the image blocks, which is required in the course of extracting the embedded watermark information in the prior art technique. Even in the presence of a geometrical deformation through the printing and intake process of the image with the embedded watermark information, the technique of this embodiment does not require any sophisticated matching process to correct the deviated position and the deformed shape of the image blocks due to such geometrical deformation, thus ensuring simple extraction of the embedded watermark information.

The geometrical deformation is ascribed to four basic geometrical transforms, trimming, scaling, sharing, and rotation as mentioned previously. The following effects are expected by application of such geometrical transforms onto the image with the watermark information embedded by the DFT. Trimming of the image scales down the DFT components and thereby the embedded watermark information. This contracts the embedded watermark information and may cause difficulties in extraction of the watermark information. Scaling of the image trims the DFT components and thereby the embedding watermark information. This may eliminate the high frequency component of the embedded watermark information. Under the application of trimming, the effects of adjoining areas may make it difficult to extract the high frequency component. Sharing of the image trims the DFT component in the direction of a processed axis and shares the DFT components in the direction of a non-processed axis. Sharing in the direction of the non-processed axis causes contamination of the components from the adjoining area. Namely the embedded watermark information itself may be subjected to sharing. Rotation of the image rotates the amplitude component about the DC component in the DFT area. The embedded watermark information may thus be rotated about the DC component.

In the digital watermark embedding method of this embodiment, on the other hand, the target embedding area is only the intermediate frequency area in the range of the embedding radius r (embedding reference circle) and the element width w as shown in FIG. 18. Such setting of the target embedding area effectively prevents extinction of the watermark information under the application of scaling, while preventing shift of the watermark information under the application of sharing. Since the predetermined frequency range is treated as one embedding element, there is no difficulty in extracting the embedded watermark information even under the application of trimming, which may contract the watermark information. As the watermark information is embedded in a concentric manner about the DC component, the range of its presence is restricted on the circumference under the application of rotation. This enhances the extraction efficiency.

The printing and intake process changes the hue, in addition to the geometrical transforms. Like the first embodiment, the digital watermark embedding method of this embodiment embeds the watermark information after color conversion of the color image data from the RGB color system into the CMYK color system. This arrangement ensures less variation in contrast and thereby practically no change of the hue in the pixels through the printing and intake process, thus facilitating extraction of the watermark information.

The adjoining pieces of the watermark information may cause mutual interference through the printing and intake process as described above. The digital watermark embedding method of this embodiment, however, sets the buffer area between the adjacent embedding elements as shown in FIG. 18, thus effectively preventing the potential interference of the watermark information.

B-2. Process of Detecting Digital Watermark

Figure 19:
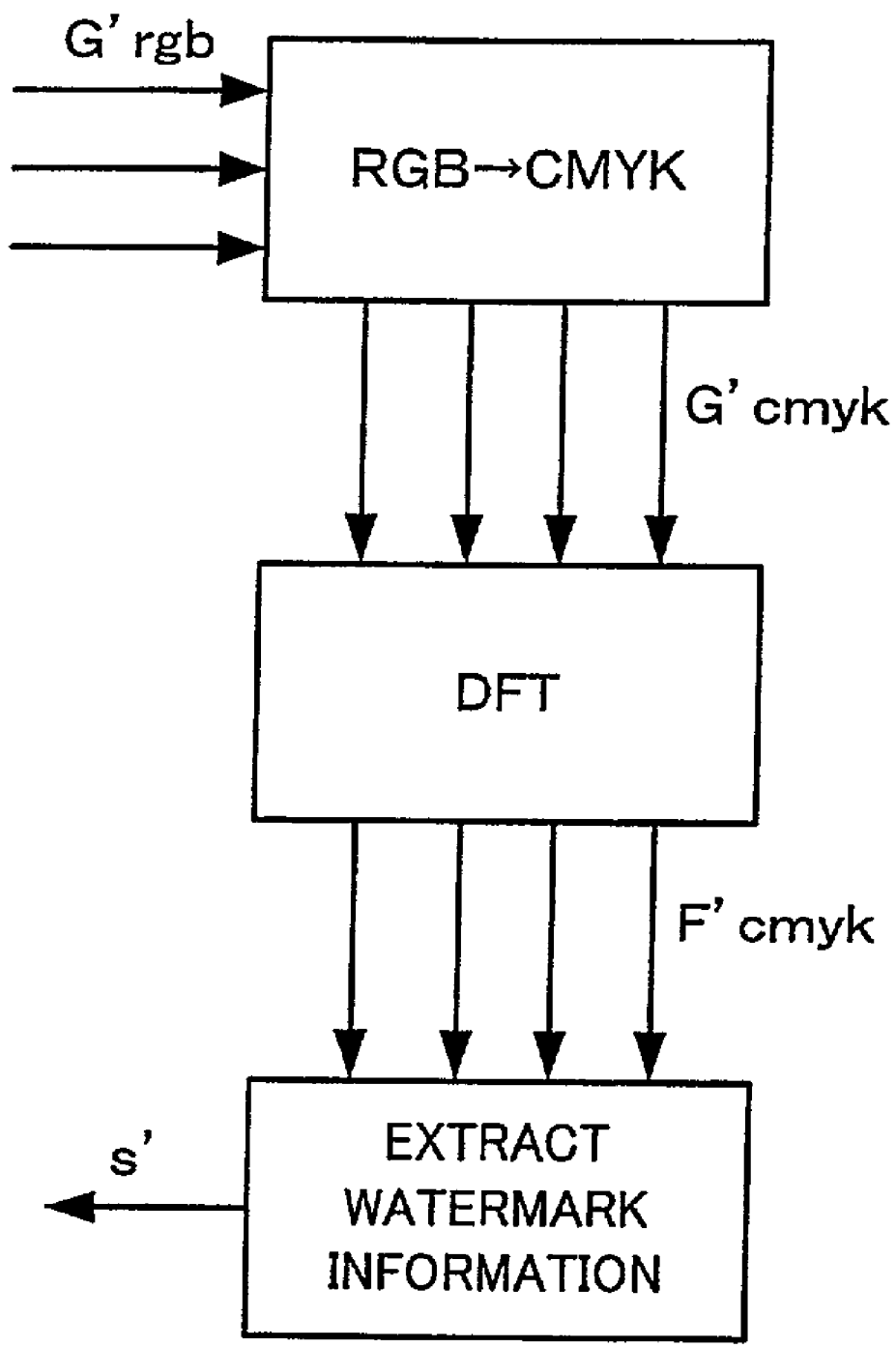
FIG. 19 shows the outline of a process of detecting the digital watermark in the second embodiment of the present invention.
Figure 20:
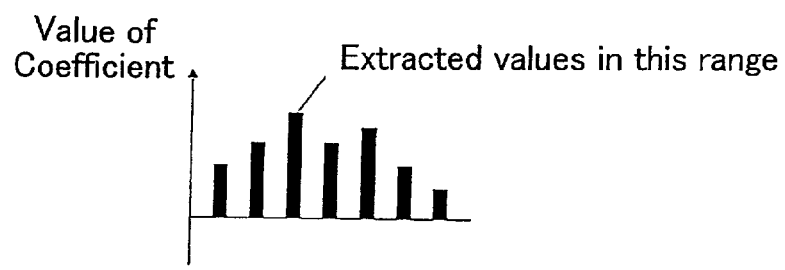
FIG. 20 shows extraction of watermark information s' (extracted value) from DFT coefficients in an extraction element.

FIG. 19 shows the outline of a process of detecting a digital watermark in the second embodiment of the present invention.

The process first provides the embedding-processed color image data $G'_{rgb}$, which has been generated by the digital watermark embedding process shown in FIG. 14.

The process then carries out color conversion of the embedding-processed color image data $G'_{rgb}$ from the RGB color system into the CMYK color system to generate embedding-processed color image data $G'_{cmyk}$.

The process subsequently applies the DFT over the whole embedding-processed color image data $G'_{cmyk}$ to obtain embedding-processed DFT coefficients $F'_{cmyk}$.

In the same manner as the digital watermark embedding process, the digital watermark extraction process applies the two-dimensional DFT over the whole image without dividing the image into multiple blocks.

The process then extracts embedded watermark information s' from the color components C, M, Y, and K of the embedding-processed DFT coefficients (the amplitude component) $F'_{cmyk}$ according to a desired extraction algorithm.

The concrete procedure provides the element presence angle c, the inter-element angle d, the embedding radius r, and the embedding width w, which have been used in the process of embedding the watermark information s. The procedure then extracts the embedded watermark information s' from the color components C, M, Y, and K of the embedding-processed DFT coefficients $F'_{cmyk}$ according to an algorithm given below.

Step 1: sets a value '0' to the watermark pointer $E_h$ ($E_h$=0);

Step 2: specifies a maximum value of the DFT coefficients in the range (extraction elements) defined by the radius r and the radius r+w and between the angle $E_h$ and the angle $E_h$+c and extracts the maximum value as the watermark information s';

Step 3: increments the watermark pointer as $E_h$=$E_h$+c+d; and

Step 4: repeats steps 2 and 3 until the watermark pointer $E_h$ exceeds 180 degrees.

Figure 21:
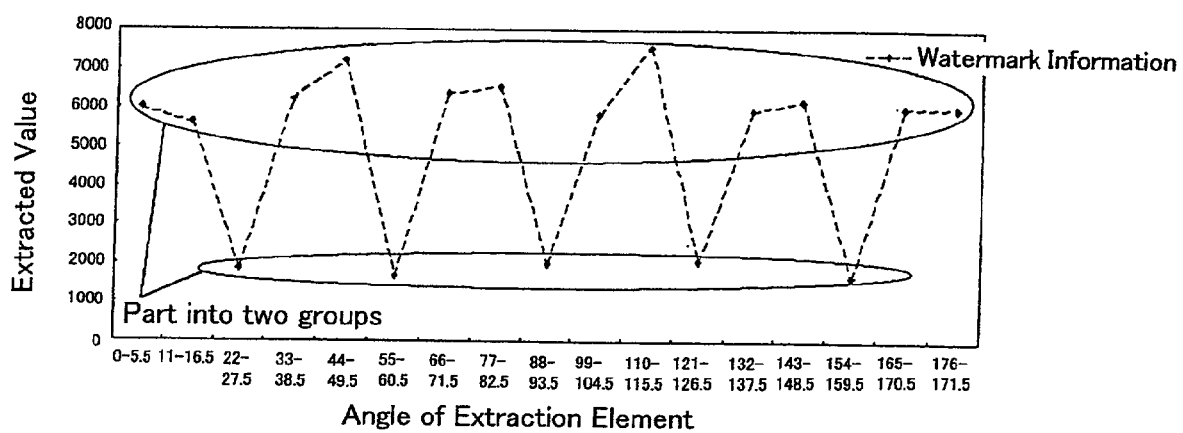
FIG. 21 is a graph showing a plot of the extracted value against the range of extraction element.

The watermark information s' is successively extracted according to the above algorithm. FIG. 21 shows a plot of the successively extracted watermark information s' against the angle of the extraction element (this corresponds to the embedding element). As clearly seen in FIG. 21, the extracted values are parted into two groups. The distribution of these two groups depends upon the values $V_0$ and $V_1$ set in the process of embedding the watermark information s. Setting the adequate values to $V_0$ and $V_1$ thus ensures accurate discrimination of these two groups by a specific threshold value.

B-3. Concrete Example

The following describes results of extraction of watermark information from image data, which has watermark information embedded by the DFT and has undergone the printing and intake process.

Figures 22, 24:
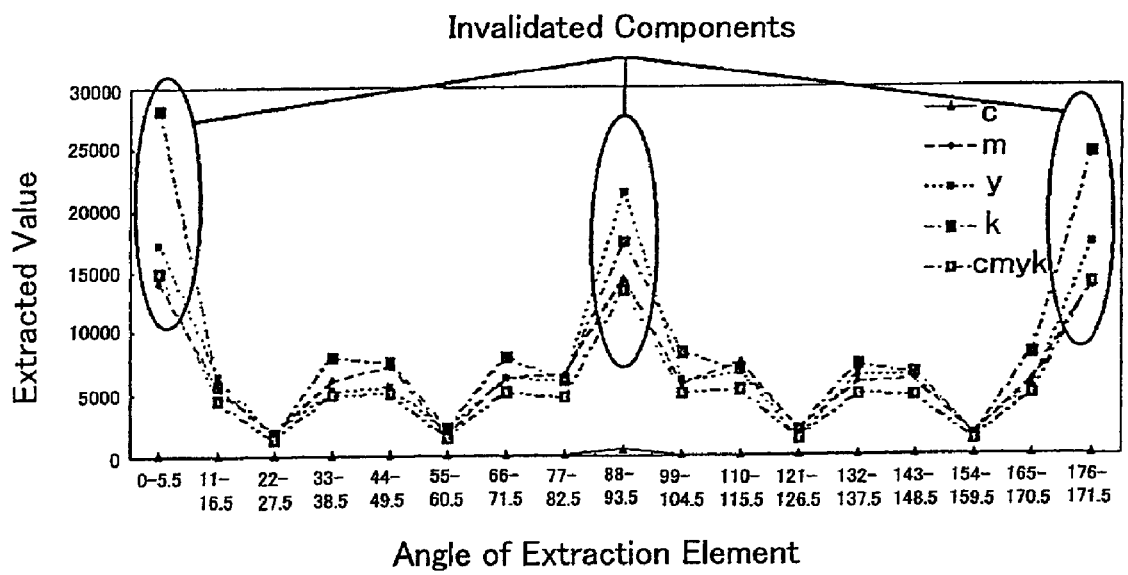
FIG. 22 shows results of extraction of watermark information from watermark information-embedded image data, which has undergone the printing and intake process.
FIG. 24 shows invalidation by the vertical and horizontal spectral components.

In this concrete example, the processing environment and the original color image data as the object of embedding the watermark information were identical with those in the concrete example of the first embodiment. The target embedding area was on a concentric circle of the radius r=64 from the DC component, and the bit string as the watermark information was s=1,1,0. FIG. 22 shows results of extraction when $V_0$ was fixed to the value '0' while $V_1$, c, d, and w were varied.

Figure 23:
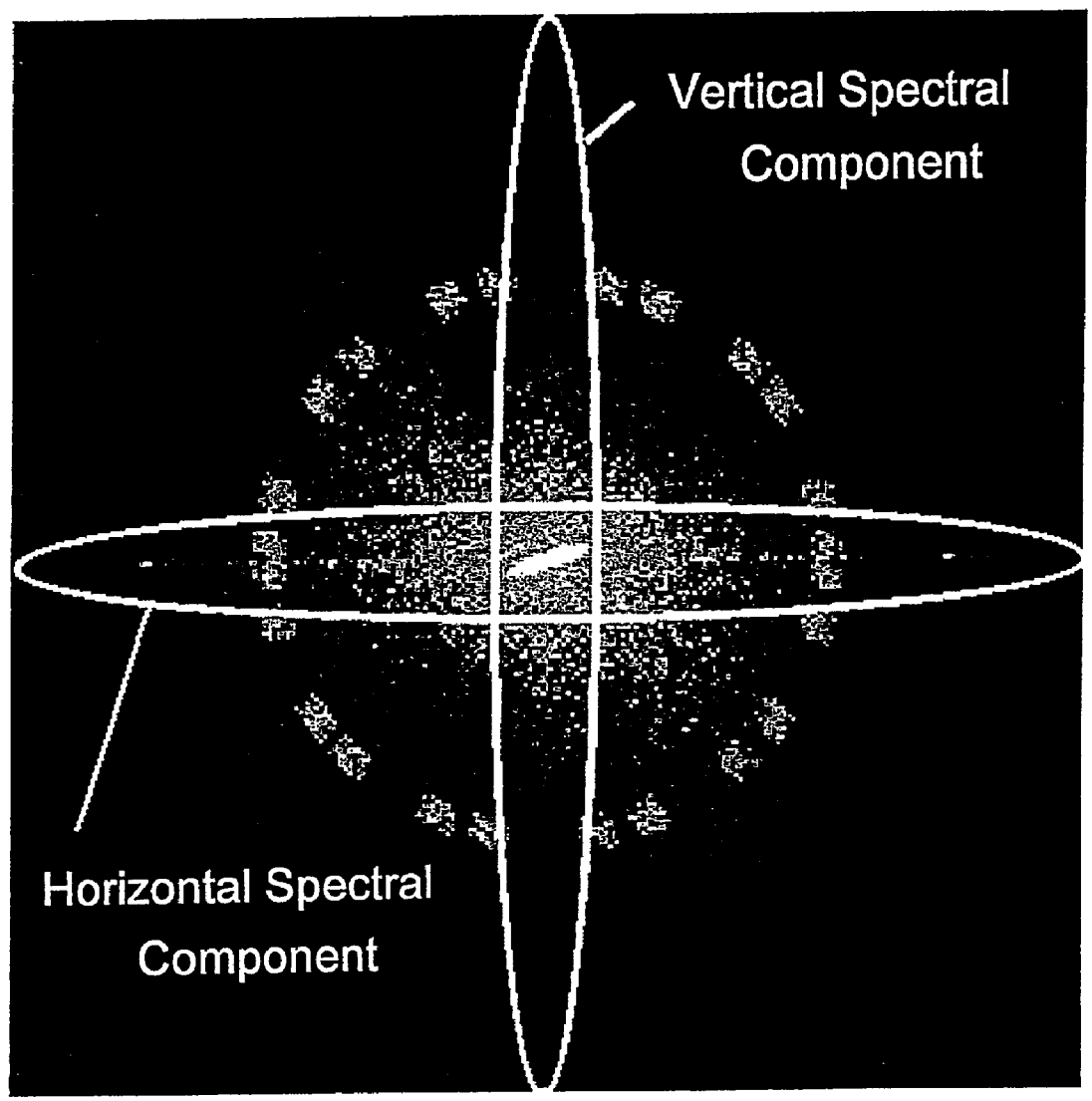
FIG. 23 shows vertical and horizontal spectral components in a DFT area.

The results show that the component C has a lower extraction rate. The reason of this phenomenon is the same as that described in the concrete example of the first embodiment. The extraction rate may be lowered, irrespective of the element presence angle c and the value $V_1$. Vertical and horizontal spectral components on the respective axes in the DFT area take extremely high values in the process of taking in the printed image as shown in FIG. 23. The embedded values are thus invalidated against such extraction elements as shown in FIG. 24.

Since the watermark information is embedded in an identical frequency band, the values of the DFT coefficients are substantially kept constant before and after the printing and intake process, unlike the case of the DCT. Namely the discrimination by the threshold value is sufficient.

C. Third Embodiment

The procedure of the first embodiment applies the DCT onto color image data as the embedding object, embeds watermark information into the generated DCT coefficients, and then applies the IDCT, the inverse transform of DCT, onto the embedding-processed DCT coefficients. This procedure requires the two different operations, DCT and IDCT, in the course of embedding the watermark information, thus taking a relatively long time for processing.

The procedure of a third embodiment accordingly does not apply the DCT onto the color image data as the embedding object, but applies the DCT onto watermark data representing watermark information to be embedded and embeds the generated DCT coefficients into the color image data.

C-1. Process of Embedding Digital Watermark

Figure 25:
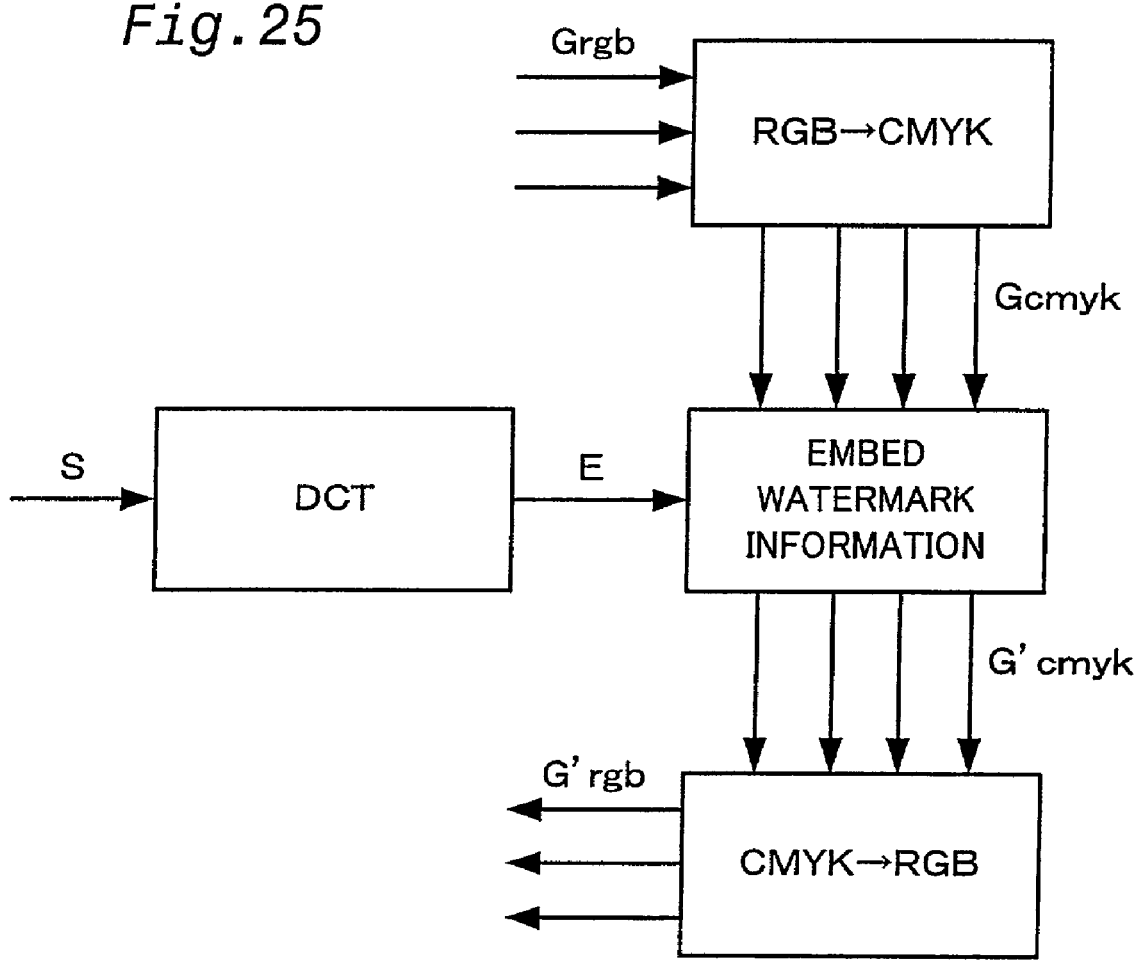
FIG. 25 shows the outline of a process of embedding a digital watermark in a third embodiment of the present invention.

FIG. 25 shows the outline of a process of embedding a digital watermark in the third embodiment of the present invention.

The process first provides original color image data $G_{rgb}$ as an object of embedding watermark information and watermark data S representing watermark information s to be embedded. Like the first embodiment, in the third embodiment, the original color image data $G_{rgb}$ is expressed by the RGB color system and has the size of M×N pixels and color of each pixel expressed by the components R, G, and B. The watermark data S is binary image data having the size of M×N pixels, which is identical with the size of the original color image data $G_{rgb}$, and color of each pixel expressed by white or black. An image defined by such watermark data S is hereinafter referred to as a watermark image. One typical example of the watermark image is a logo image including a black logo in white background. Pixels in the logo part (black part) have a value '1' and pixels in the non-logo part (white part) have a value '0'.

The process subsequently converts the original color image data $G_{rgb}$ from the RGB color system into the CMYK color system and obtains color-converted original color image data $G_{cmyk}$. The color-converted original color image data $G_{cmyk}$ has the size of M×N pixels and color of each pixel expressed by the components C, M, Y, and K.

The process then makes the whole watermark data S subjected to discrete cosine transform (DCT) as an orthogonal transformation and gains DCT coefficients E as frequency components (transform coefficients). The technique of this embodiment applies the DCT over the whole watermark image without dividing the watermark image into multiple blocks.

The watermark data S is image data as mentioned above, and is expressed by two-dimensional discrete values, so that two-dimensional DCT is applicable. The two-dimensional DCT over the whole image advantageously ensures homogeneous dispersion of the applied operation in the whole image.

The process subsequently embeds the DCT coefficients E generated from the watermark data S into the components C, M, Y, and K of the color-converted original color image data $G_{cmyk}$ to obtain embedding-processed color image data $G'_{cmyk}$ according to a desired embedding algorithm similar to that discussed in the first embodiment.

Figure 26:
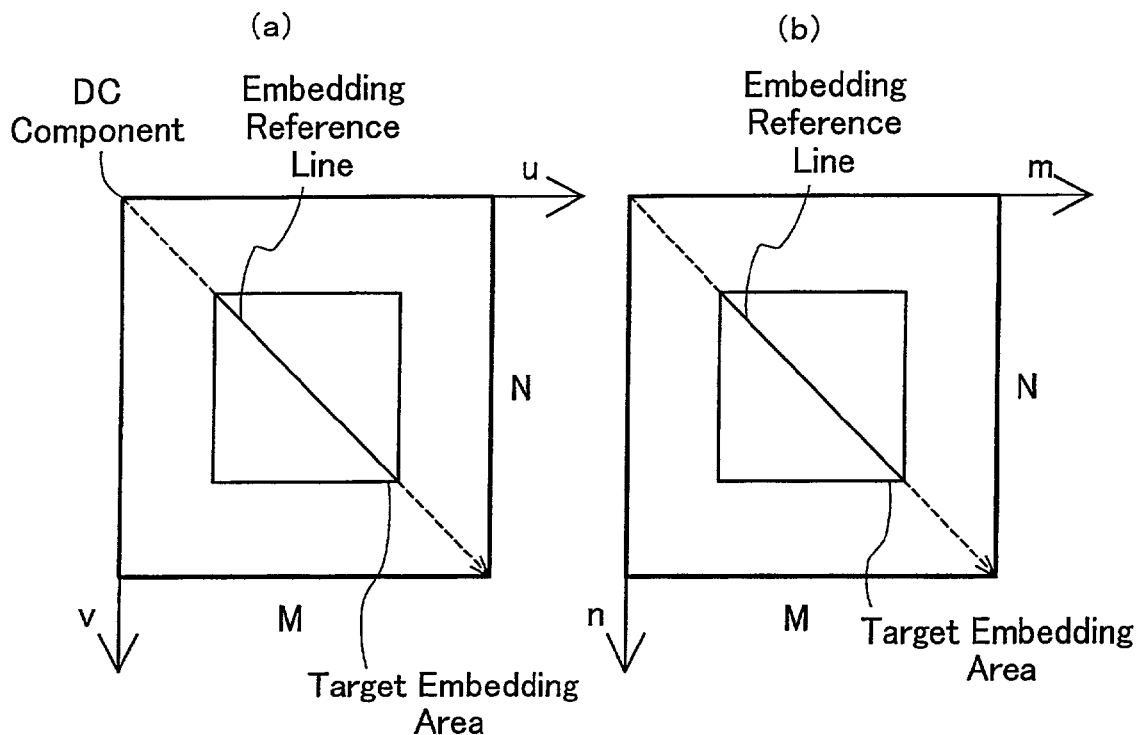
FIG. 26 shows a process of embedding DCT coefficients, which are obtained from watermark data, into original color image data.

The concrete procedure assumes DCT coordinates (u,v) shown in FIG. 26(a) with regard to the DCT coefficients E generated from the watermark data S, and specifies an intermediate frequency area as a target embedding area. The procedure then selects DCT coefficients located on a straight line (embedding reference line) extending from the DC component towards the higher frequencies among the DCT coefficients in the target embedding area. The procedure also assumes pixel coordinates (m,n) shown in FIG. 26(b) with regard to the image defined by the original color image data $G_{cmyk}$, and specifies a central portion of the image as a target embedding area. The procedure then selects pixels located on a straight line (embedding reference line) extending from the upper left corner to the lower right corner of the image among the pixels in the target embedding area. The procedure subsequently respectively embeds the selected DCT coefficients into the selected pixels located at corresponding positions.

Referring back to FIG. 25, the process carries out color conversion of the resulting color image data $G'_{cmyk}$ from the CMYK color system into the RGB color system to obtain embedding-processed color image data $G'_{rgb}$.

The embedding-processed color image data $G'_{rgb}$ thus obtained is substantially equivalent to the embedding-processed color image data $G'_{rgb}$ obtained by the digital watermark embedding method of the first embodiment.

As described above, the digital watermark embedding method of this embodiment does not apply the DCT onto the color image data, but applies the DCT onto the watermark data representing the watermark information and embeds the obtained DCT coefficients into the color image data. This method does not require the IDCT, the inverse transform of the DCT, and thus significantly shortens the processing time. Application of the DCT onto the black and white binary image data (watermark data) attains the shorter processing time than that in the case of application onto the color image data of the color components C, M, Y, and K, since the quantity of the binary image data is less than the quantity of the color image data.

The method of this embodiment applies the DCT over the whole watermark image defined by the watermark data (binary image data) without dividing the watermark image into multiple blocks and then embeds the generated DCT coefficients into the color image data. Compared with the prior art technique of dividing the image into multiple blocks, this procedure advantageously ensures homogeneous dispersion of the embedded watermark information in the whole image.

Like the first embodiment, the digital watermark embedding method of this embodiment does not require correction of the position and the shape of the image blocks, which is required in the course of extracting the embedded watermark information in the prior art technique. Even in the presence of a geometrical deformation through the printing and intake process of the image with the embedded watermark information, the technique of this embodiment does not require any sophisticated matching process to correct the deviated position and the deformed shape of the image blocks due to such geometrical deformation, thus ensuring simple extraction of the embedded watermark information.

In the digital watermark embedding method of this embodiment, the target embedding area with regard to the DCT coefficients E generated from the watermark data S is the intermediate frequency area as shown in FIG. 26(a). Such setting of the target embedding area effectively prevents extinction of the watermark information under the application of scaling, one geometrical transform, while preventing separation of the watermark information under the application of sharing, another geometrical transform. As the procedure selects the DCT coefficients located on the straight line (embedding reference line) extending from the DC component towards the higher frequencies among the DCT coefficients E generated from the watermark data S and embeds the selected DCT coefficients into the corresponding pixels of the original color image data. Interactions of the DCT components with the DST components can thus be eliminated under the application of rotation, still another geometrical transform.

The printing and intake process also changes the hue, in addition to the geometrical transforms. Like the first embodiment, the digital watermark embedding method of this embodiment embeds the watermark information after color conversion of the color image data from the RGB color system into the CMYK color system. This arrangement ensures less variation in contrast through the printing and intake process, thus facilitating extraction of the watermark information.

C-2. Process of Extracting Digital Watermark

As discussed above, the embedding-processed color image data $G'_{rgb}$ obtained by the digital watermark embedding method of this embodiment is substantially equivalent to the embedding-processed color image data $G'_{rgb}$ obtained by the digital watermark embedding method of the first embodiment. A digital watermark extraction method similar to that of the first embodiment is accordingly applicable to extract the embedded watermark information from the embedding-processed color image data $G'_{rgb}$. The digital watermark extraction process of this embodiment is thus not specifically described.

D. Fourth Embodiment

The procedure of the second embodiment applies the DFT onto color image data as the embedding object, embeds watermark information into the generated DFT coefficients, and then applies the IDFT, the inverse transform of DFT, onto the embedding-processed DFT coefficients. As in the case of the DCT, this procedure requires the two different operations, DFT and IDFT, in the course of embedding the watermark information, thus taking a relatively long time for processing.

The procedure of a fourth embodiment accordingly does not apply the DFT onto the color image data as the embedding object, but applies the DFT onto watermark data representing watermark information to be embedded and embeds the generated DFT coefficients into the color image data.

D-1. Process of Embedding Digital Watermark

Figure 27:
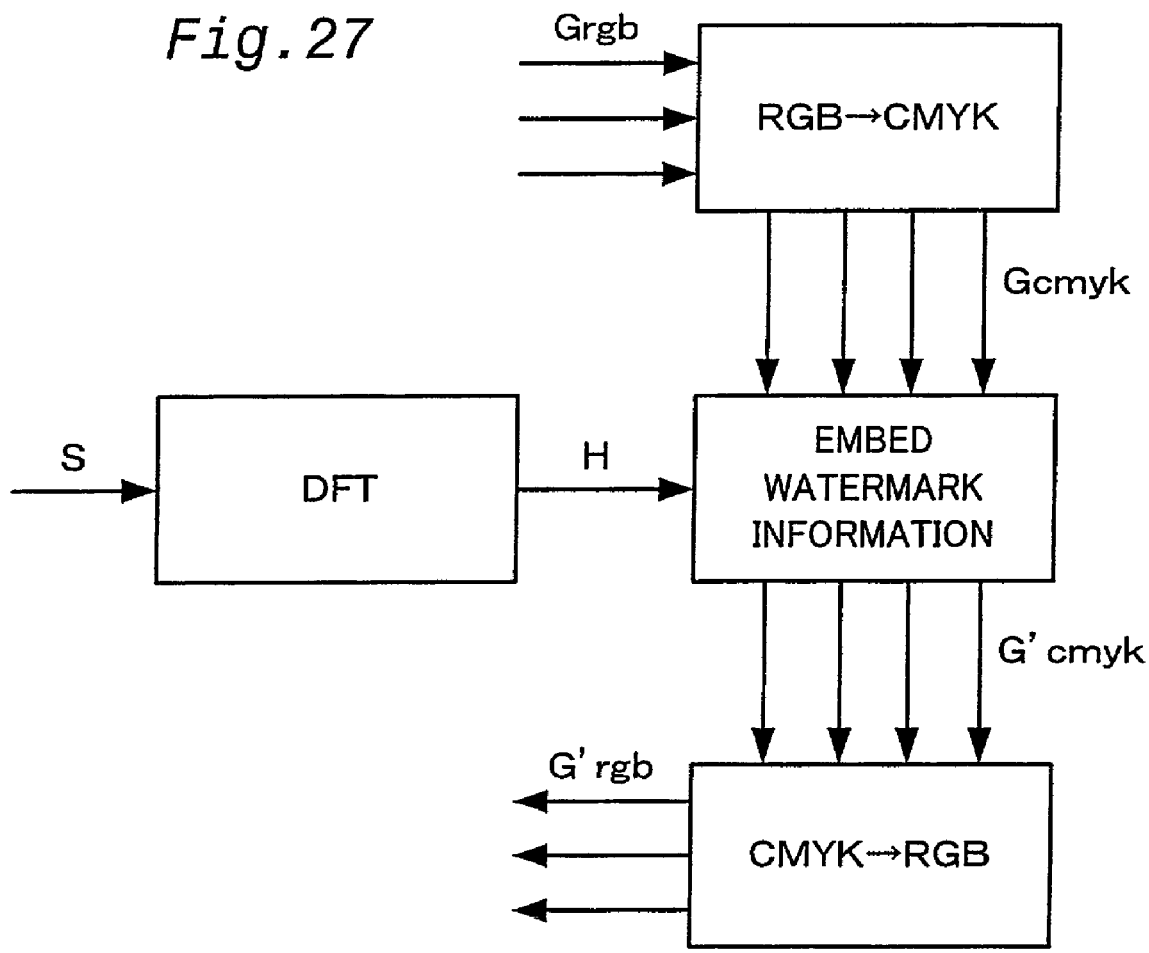
FIG. 27 shows the outline of a process of embedding a digital watermark in a fourth embodiment of the present invention.

FIG. 27 shows the outline of a process of embedding a digital watermark in the fourth embodiment of the present invention.

The process first provides original color image data $G_{rgb}$ as an object of embedding watermark information and watermark data S representing watermark information s to be embedded. Like the second embodiment, in the fourth embodiment, the original color image data $G_{rgb}$ is expressed by the RGB color system and has the size of M×N pixels and color of each pixel expressed by the components R, G, and B. Like the third embodiment, the watermark data S is binary image data having the size of M×N pixels, which is identical with the size of the original color image data $G_{rgb}$, and color of each pixel expressed by white or black.

The process subsequently converts the original color image data $G_{rgb}$ from the RGB color system into the CMYK color system and obtains color-converted original color image data $G_{cmyk}$. The color-converted original color image data $G_{cmyk}$ has the size of M×N pixels and color of each pixel expressed by the components C, M, Y, and K.

The process then makes the whole watermark data S subjected to discrete Fourier transform (DFT) as an orthogonal transformation and gains DFT coefficients H as frequency components (transform coefficients). The technique of this embodiment applies the DFT over the whole watermark image without dividing the watermark image into multiple blocks.

The watermark data S is image data as mentioned above, and is expressed by two-dimensional discrete values, so that two-dimensional DFT is applicable. The two-dimensional DFT over the whole image advantageously ensures homogeneous dispersion of the applied operation in the whole image.

The process subsequently embeds the DFT coefficients H (amplitude component) generated from the watermark data S into the components C, M, Y, and K of the color-converted original color image data $G_{cmyk}$ to obtain embedding-processed color image data $G'_{cmyk}$ according to a desired embedding algorithm similar to that discussed in the second embodiment.

Figure 28:
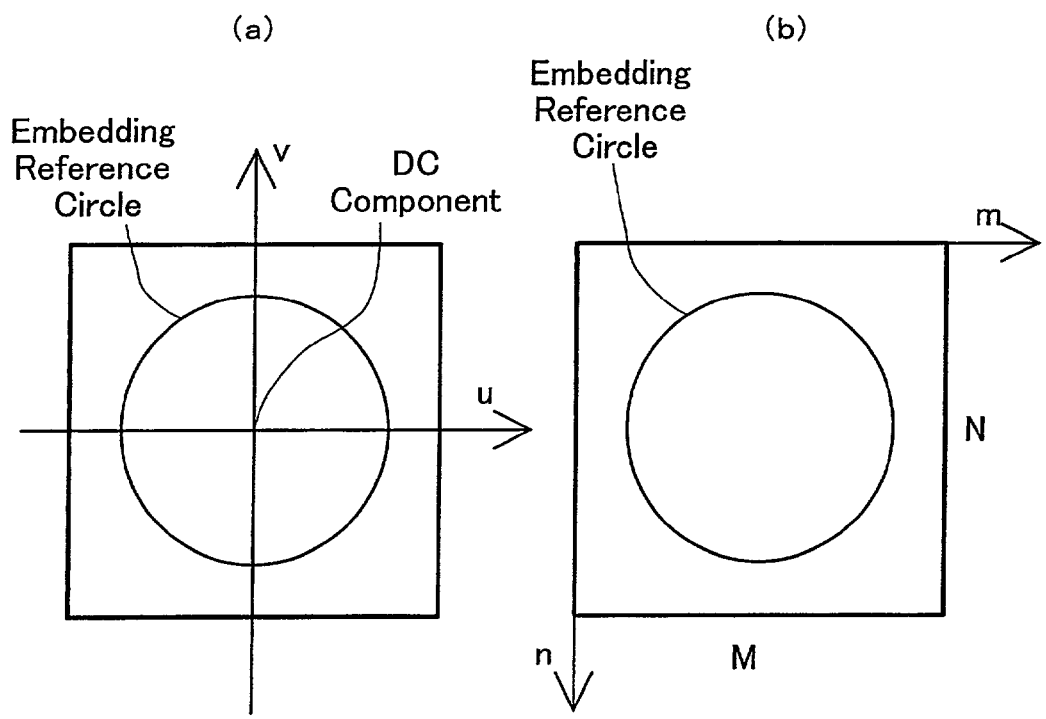
FIG. 28 shows a process of embedding DFT coefficients, which are obtained from watermark data, into original color image data.

The concrete procedure assumes DFT coordinates (u,v) shown in FIG. 28(a) with regard to the DFT coefficients H generated from the watermark data S, and specifies an intermediate frequency area as a target embedding area. The procedure then selects DFT coefficients located on a concentric circle (embedding reference circle) about the DC component among the DFT coefficients in the target embedding area. The procedure also assumes pixel coordinates (m,n) shown in FIG. 28(b) with regard to the image defined by the original color image data $G_{cmyk}$, and selects pixels located on a concentric circle (embedding reference circle) about the center of the image among the pixels in the image. The procedure subsequently respectively embeds the selected DFT coefficients into the selected pixels located at corresponding positions.

The process carries out color conversion of the resulting color image data $G'_{cmyk}$ from the CMYK color system into the RGB color system to obtain embedding-processed color image data $G'_{rgb}$.

The embedding-processed color image data $G'_{rgb}$ thus obtained is substantially equivalent to the embedding-processed color image data $G'_{rgb}$ obtained by the digital watermark embedding method of the second embodiment.

As described above, the digital watermark embedding method of this embodiment does not apply the DFT onto the color image data, but applies the DFT onto the watermark data representing the watermark information and embeds the obtained DFT coefficients into the color image data. This method does not require the IDFT, the inverse transform of the DFT and thus significantly shortens the processing time. Application of the DFT onto the black and white binary image data (watermark data) attains the shorter processing time than that in the case of application onto the color image data of the color components C, M, Y, and K, since the quantity of the binary image data is less than the quantity of the color image data.

The method of this embodiment applies the DFT over the whole watermark image defined by the watermark data (binary image data) without dividing the watermark image into multiple blocks and then embeds the generated DFT coefficients into the color image data. Compared with the prior art technique of dividing the image into multiple blocks, this procedure advantageously ensures homogeneous dispersion of the embedded watermark information in the whole image.

Like the second embodiment, the digital watermark embedding method of this embodiment does not require correction of the position and the shape of the image blocks, which is required in the course of extracting the embedded watermark information in the prior art technique. Even in the presence of a geometrical deformation through the printing and intake process of the image with the embedded watermark information, the technique of this embodiment does not require any sophisticated matching process to correct the deviated position and the deformed shape of the image blocks due to such geometrical deformation, thus ensuring simple extraction of the embedded watermark information.

In the digital watermark embedding method of this embodiment, the target embedding area with regard to the DFT coefficients H generated from the watermark data S is the intermediate frequency area as shown in FIG. 28(a). Such setting of the target embedding area effectively prevents extinction of the watermark information under the application of scaling, one geometrical transform, while preventing separation of the watermark information under the application of sharing, another geometrical transform. As the procedure selects the DFT coefficients located on the concentric circle (embedding reference circle) about the DC component among the DFT coefficients H generated from the watermark data S and embeds the selected DFT coefficients into the corresponding pixels of the original color image, the range of its presence is restricted on the circumference under the application of rotation, still another geometrical transform. This enhances the extraction efficiency.

The printing and intake process also changes the hue, in addition to the geometrical transforms. Like the second embodiment, the digital watermark embedding method of this embodiment embeds the watermark information after color conversion of the color image data from the RGB color system into the CMYK color system. This arrangement ensures less variation in contrast through the printing and intake process, thus facilitating extraction of the watermark information.

D-2. Process of Extracting Digital Watermark

As discussed above, the embedding-processed color image data $G'_{rgb}$ obtained by the digital watermark embedding method of this embodiment is substantially equivalent to the embedding-processed color image data $G'_{rgb}$ obtained by the digital watermark embedding method of the second embodiment. A digital watermark extraction method similar to that of the second embodiment is accordingly applicable to extract the embedded watermark information from the embedding-processed color image data $G'_{rgb}$. The digital watermark extraction process of this embodiment is thus not specifically described.

E. General Construction of Apparatus and Processing Routines

Figure 29:
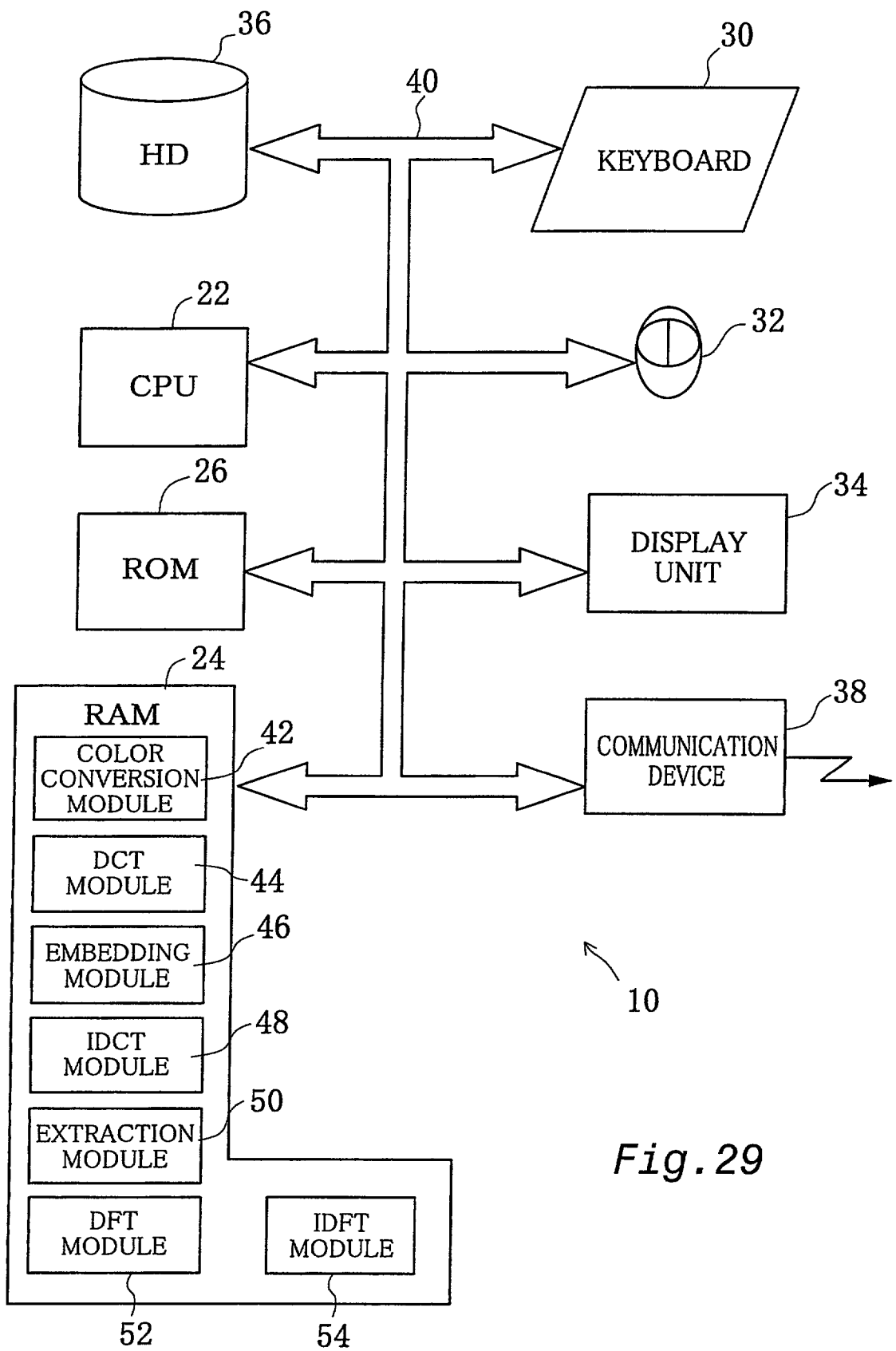
FIG. 29 is a block diagram illustrating the construction of a digital watermark processing apparatus in one embodiment of the present invention.

The following describes the construction of a digital watermark processing apparatus 10 that executes the digital watermark embedding process and the digital watermark detecting process discussed above, with reference to FIG. 29. FIG. 29 is a block diagram illustrating the construction of the digital watermark processing apparatus 10 in one embodiment of the present invention. The digital watermark processing apparatus 10 is a computer including a CPU 22, a RAM 24, a ROM 26, a keyboard 30, a mouse 32, a display unit 34 such as a CRT, a hard disk unit 36, a communication device 38 such as a network card or a modem, and a bus 40 mutually connecting these elements. Diverse interface circuits are omitted from the illustration of FIG. 29. The communication device 38 is connected to a computer network via a communication line (not shown). A server (not shown) on the computer network functions as a program supply device that supplies computer programs to the digital watermark processing apparatus 10 via the communication line.

A computer program for attaining the functions of a color conversion module 42, a DCT module 44, an embedding module 46, an IDCT module 48, an extraction module 50, a DFT module 52, and an IDFT module 54 is stored in the RAM 24. The detailed functions of these modules 42 through 54 will be discussed later.

The computer program for attaining the functions of the modules 42 through 54 is supplied in a form recorded in a computer readable recording medium, such as a flexible disk or a CD-ROM. The computer reads the computer program from the recording medium and transfers the computer program to an internal storage device or an external storage device. The computer program may otherwise be supplied to the computer via a communication path. A microprocessor in the computer executes the computer program stored in the internal storage device to attain the respective functions. The computer may directly read and execute the computer program recorded in the recording medium.

In the specification hereof, the computer is a concept including both hardware and an operating system and represents the hardware working under the control of the operating system. In the case where the operating system is unnecessary and an application program alone or a firmware alone operates the hardware, the hardware itself corresponds to the computer. The hardware includes at least a microprocessor such as a CPU and means for reading the computer programs recorded in the recording medium. For example, a CPU and a ROM are incorporated in an electronic device, such as a CD-RAM drive or a DVD-RAM drive and the electronic device attains the functions of the computer, this electronic device is naturally included in the concept of the computer. The computer program includes program codes that cause the computer to attain the functions of the respective modules. Part of the functions may be actualized not by the application program but by the operating system. The program of the digital watermark embedding and detection process may be added in the form of a plug-in to a signal processing program.

The 'recording medium' in the present invention may be any of flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

Figure 30:
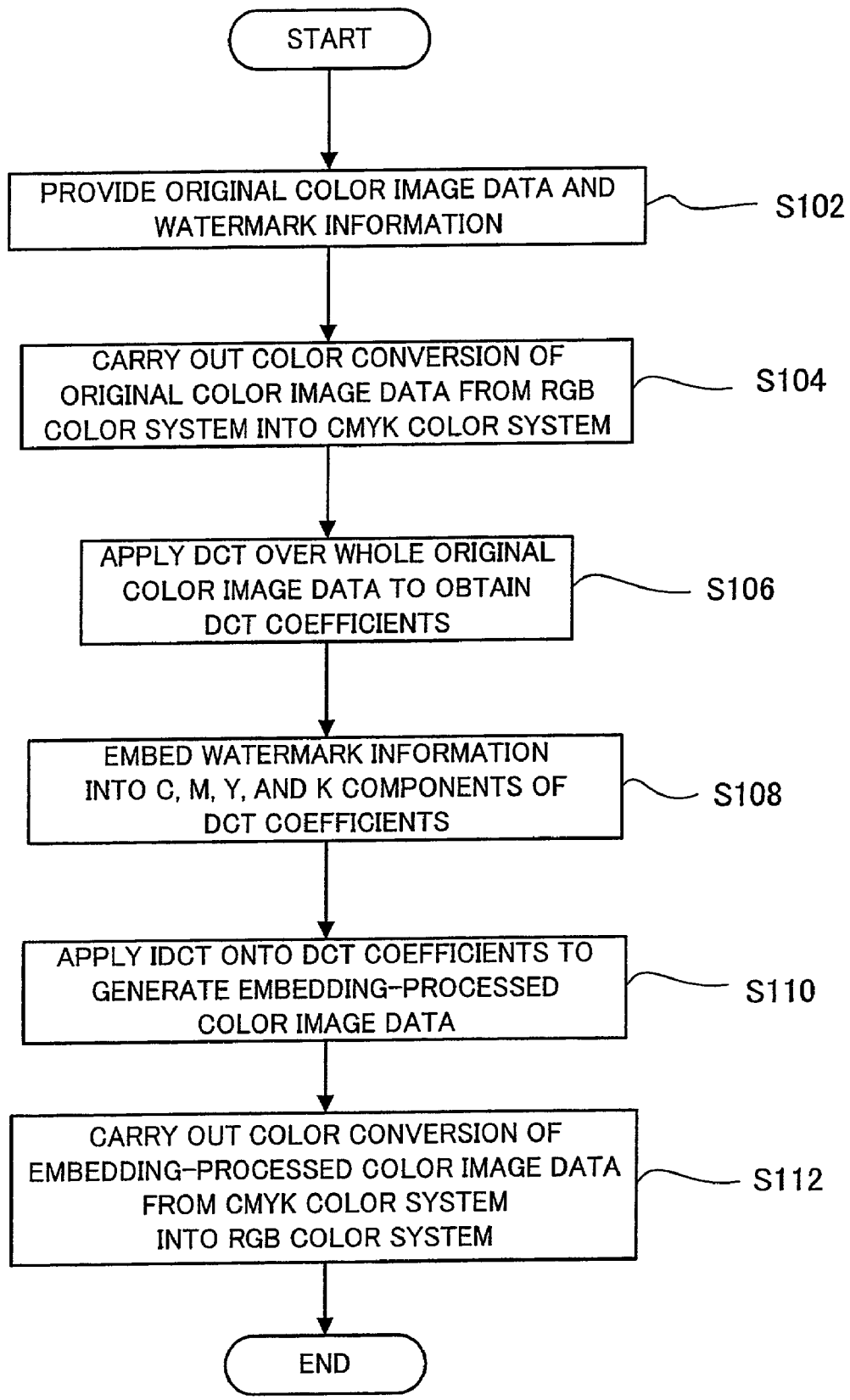
FIG. 30 is a flowchart showing a digital watermark embedding routine executed by a color conversion module, a DCT module, an embedding module, and an IDCT module, corresponding to the first embodiment.

FIG. 30 is a flowchart showing a digital watermark embedding routine executed by the color conversion module 42, the DCT module 44, the embedding module 46, and the IDCT module 48, corresponding to the first embodiment.

The color conversion module 42 provides original color image data $G_{rgb}$ as an object of embedding watermark information and watermark information s to be embedded at step S102, and carries out color conversion of the original color image data $G_{rgb}$ from the RGB color system into the CMYK color system to obtain color-converted original color image data $G_{cmyk}$ at step S104. The DCT module 44 applies the DCT over the whole color-converted original color image data $G_{cmyk}$ to generate DCT coefficients $D_{cmyk}$ at step S106. The embedding module 46 embeds the watermark information s into the components C, M, Y, and K of the DCT coefficients $D_{cmyk}$ at step S108. The IDCT module 48 applies the IDCT onto DCT coefficients D'cmyk with the watermark information s embedded therein to generate embedding-processed color image data $G'_{cmyk}$ at step S110. The color conversion module 42 carries out color conversion of the embedding-processed color image data $G'_{cmyk}$ from the CMYK color system into the RGB color system to obtain embedding-processed color image data $G'_{rgb}$ at step S112.

This processing routine actualizes the digital watermark embedding process of the first embodiment.

Figure 31:
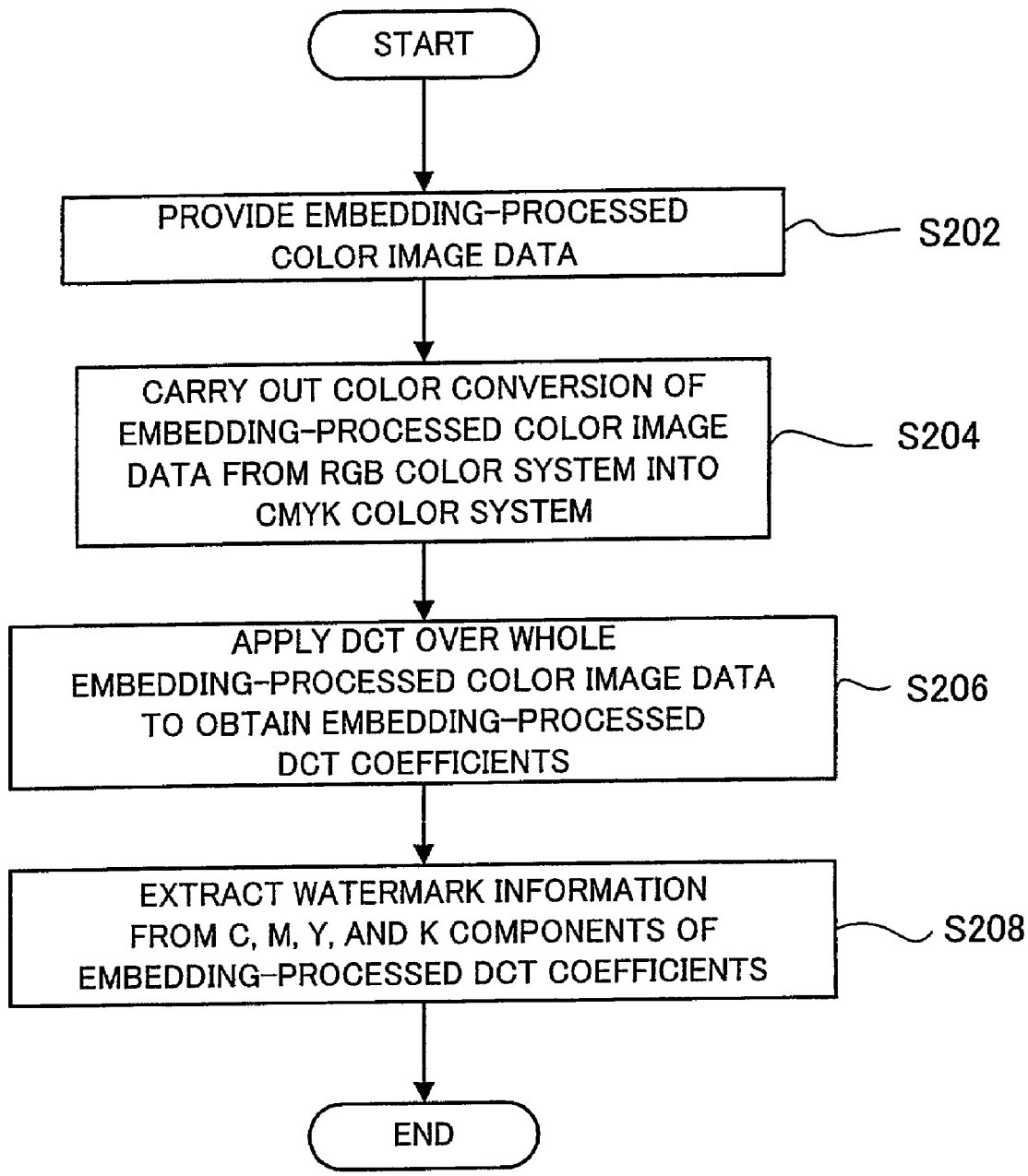
FIG. 31 is a flowchart showing a digital watermark extraction routine executed by the color conversion module, the DCT module, and an extraction module, corresponding to the first embodiment.

FIG. 31 is a flowchart showing a digital watermark extraction routine executed by the color conversion module 42, the DCT module 44, and the extraction module 50, corresponding to the first embodiment.

The color conversion module 42 provides the embedding-processed color image data G'$_{rgb}$ as an object of extraction of watermark information at step S202, and carries out color conversion of the embedding-processed color image data G'$_{rgb}$ from the RGB color system into the CMYK color system to generate embedding-processed color image data G'$_{cmyk}$ at step S204. The DCT module 44 applies the DCT over the whole embedding-processed color image data G'$_{cmyk}$ to obtain embedding-processed DCT coefficients D'$_{cmyk}$ at step S206. The extraction module 50 extracts the embedded watermark information s' from the C, M, Y, and K components of the embedding-processed DCT coefficients D'$_{cmyk}$ at step S208.

This processing routine actualizes the digital watermark extraction process of the first embodiment.

Figure 32:
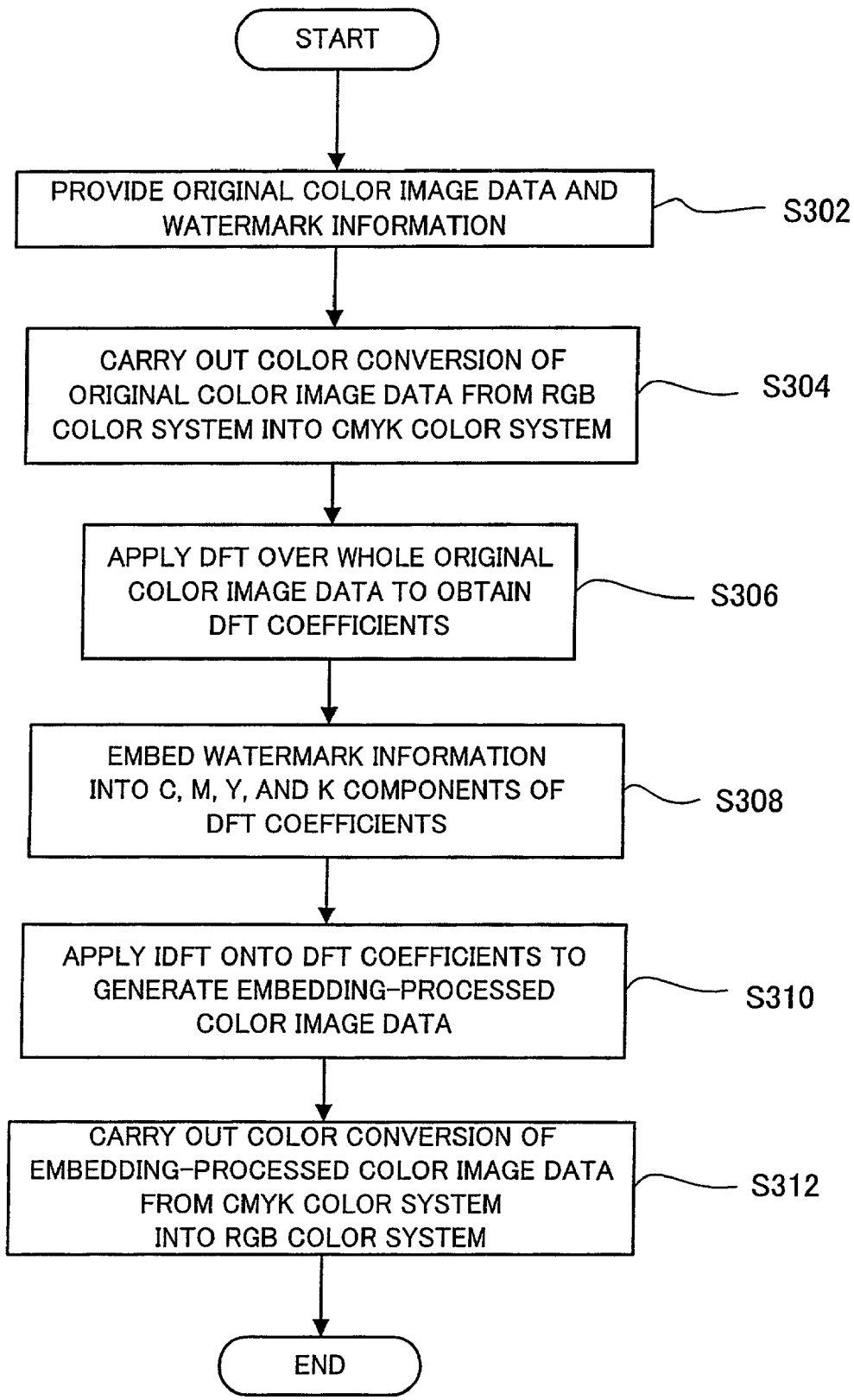
FIG. 32 is a flowchart showing a digital watermark embedding routine executed by the color conversion module, a DFT module, the embedding module, and an IDFT module, corresponding to the second embodiment.

FIG. 32 is a flowchart showing a digital watermark embedding routine executed by the color conversion module 42, the DFT module 52, the embedding module 46, and the IDFT module 54, corresponding to the second embodiment.

The color conversion module 42 provides original color image data G$_{rgb}$ as an object of embedding watermark information and watermark information s to be embedded at step S302, and carries out color conversion of the original color image data G$_{rgb}$ from the RGB color system into the CMYK color system to obtain color-converted original color image data G$_{cmyk}$ at step S304. The DFT module 52 applies the DFT over the whole color-converted original color image data G$_{cmyk}$ to generate DFT coefficients F$_{cmyk}$ at step S306. The embedding module 46 embeds the watermark information s into the components C, M, Y, and K of the DFT coefficients F$_{cmyk}$ at step S308. The IDFT module 54 applies the IDFT onto DFT coefficients F'$_{cmyk}$ with the watermark information s embedded therein to generate embedding-processed color image data G'$_{cmyk}$ at step S310. The color conversion module 42 carries out color conversion of the embedding-processed color image data G'$_{cmyk}$ from the CMYK color system into the RGB color system to obtain embedding-processed color image data G'$_{rgb}$ at step S312.

This processing routine actualizes the digital watermark embedding process of the second embodiment.

Figure 33:
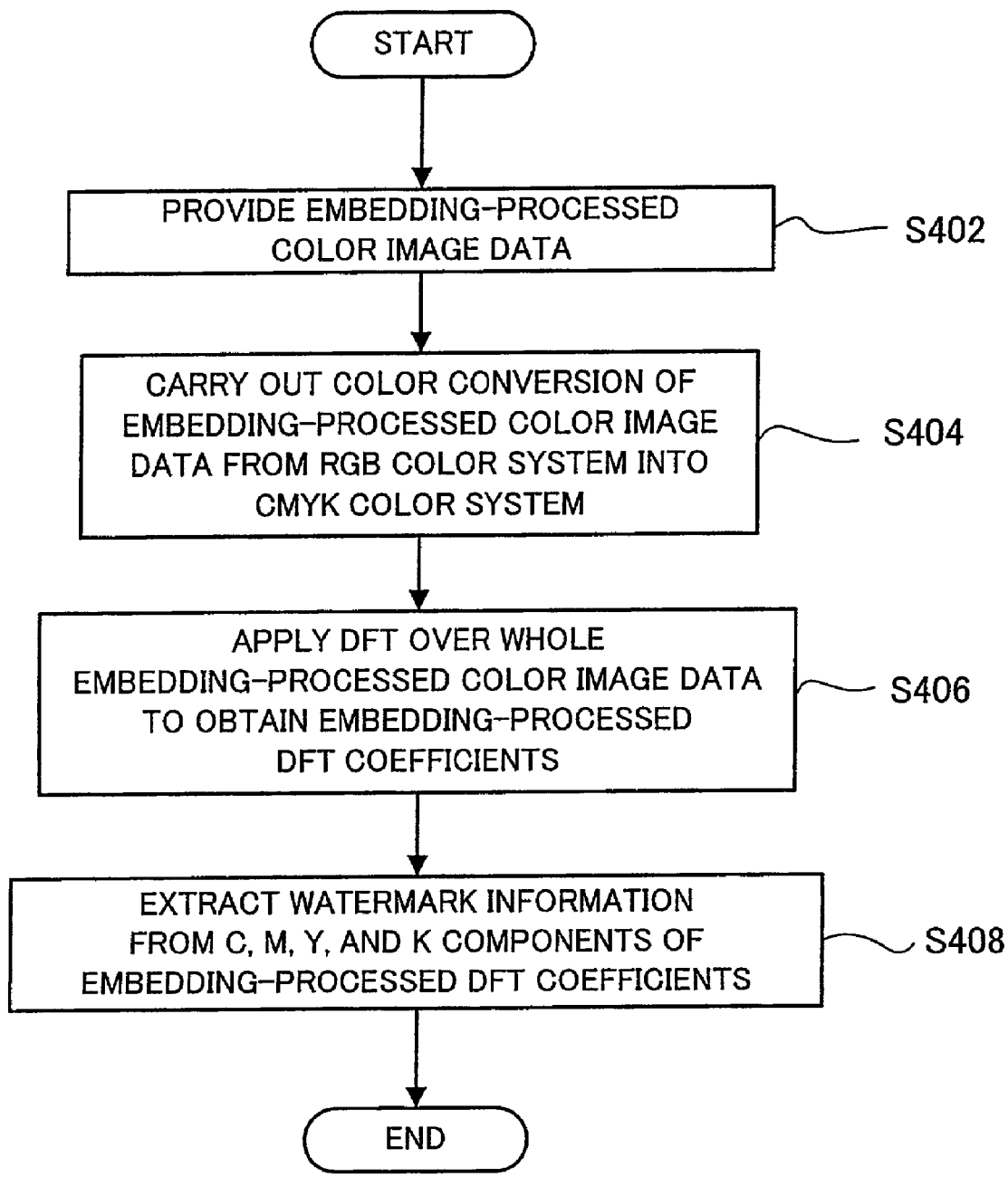
FIG. 33 is a flowchart showing a digital watermark extraction routine executed by the color conversion module, the DFT module, and the extraction module, corresponding to the second embodiment.

FIG. 33 is a flowchart showing a digital watermark extraction routine executed by the color conversion module 42, the DFT module 52, and the extraction module 50, corresponding to the second embodiment.

The color conversion module 42 provides the embedding-processed color image data G'$_{rgb}$ as an object of extraction of watermark information at step S402, and carries out color conversion of the embedding-processed color image data G'$_{rgb}$ from the RGB color system into the CMYK color system to generate embedding-processed color image data G'$_{cmyk}$ at step S404. The DFT module 52 applies the DFT over the whole embedding-processed color image data G'$_{cmyk}$ to obtain embedding-processed DFT coefficients F'$_{cmyk}$ at step S406. The extraction module 50 extracts the embedded watermark information s' from the C, M, Y, and K components of the embedding-processed DFT coefficients F'$_{cmyk}$ at step S408.

This processing routine actualizes the digital watermark extraction process of the second embodiment.

Figure 34:
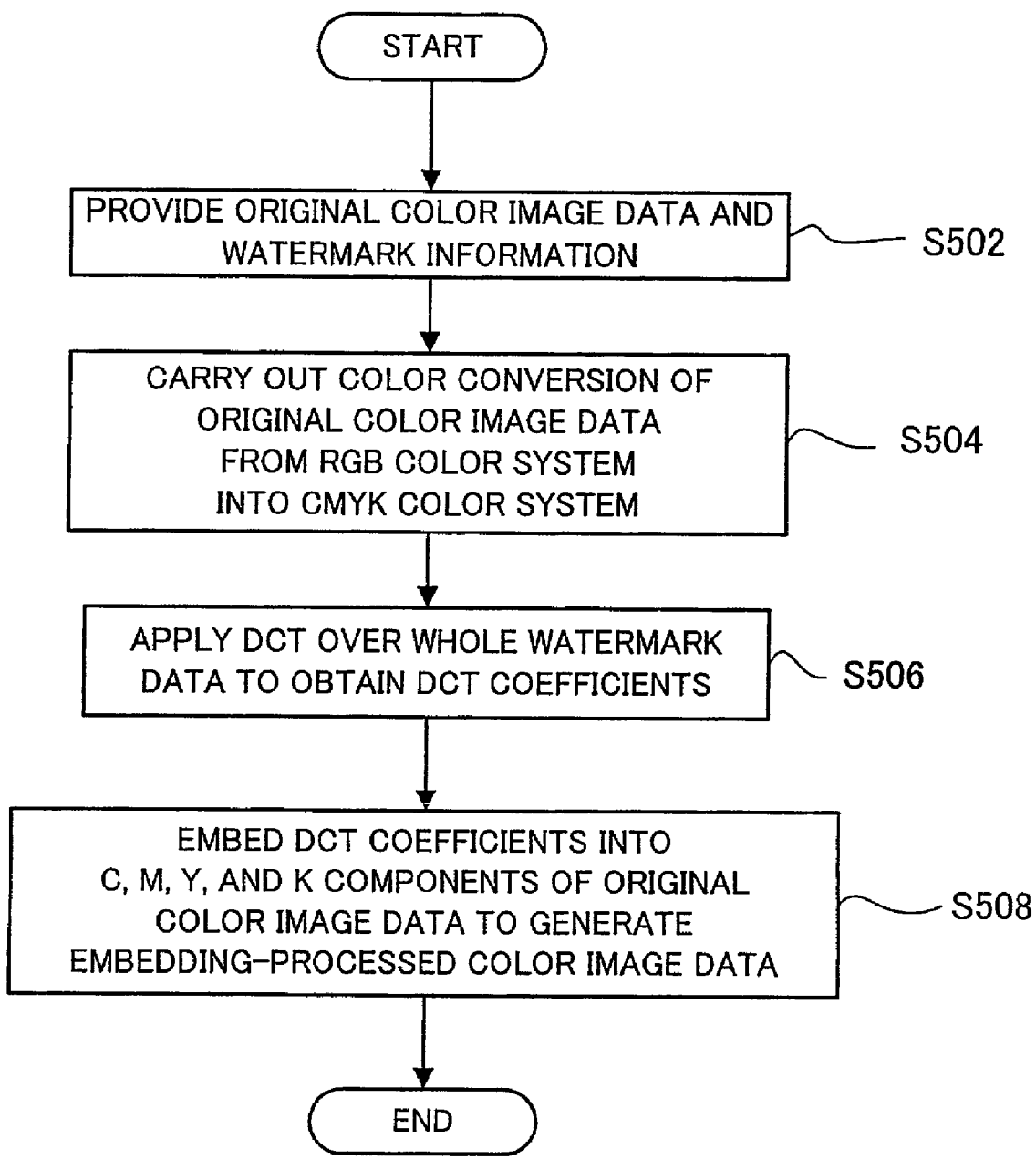
FIG. 34 is a flowchart showing a digital watermark embedding routine executed by the color conversion module, the DCT module, and the embedding module, corresponding to the third embodiment.

FIG. 34 is a flowchart showing a digital watermark embedding routine executed by the color conversion module 42, the DCT module 44, and the embedding module 46, corresponding to the third embodiment.

The color conversion module 42 provides original color image data G$_{rgb}$ as an object of embedding watermark information and watermark data S representing watermark information s to be embedded at step S502, and carries out color conversion of the original color image data G$_{rgb}$ from the RGB color system into the CMYK color system to obtain color-converted original color image data G$_{cmyk}$ at step S504. The DCT module 44 applies the DCT over the whole watermark data S to generate DCT coefficients E at step S506. The embedding module 46 embeds the DCT coefficients E generated from the watermark data S into the C, M, Y, and K components of the color-converted original color image data G$_{cmyk}$ to obtain embedding-processed color image data G'$_{cmyk}$ at step S508.

This processing routine actualizes the digital watermark embedding process of the third embodiment.

FIG. 35 is a flowchart showing a digital watermark embedding routine executed by the color conversion module 42, the DFT module 52, and the embedding module 46, corresponding to the fourth embodiment.

The color conversion module 42 provides original color image data G$_{rgb}$ as an object of embedding watermark information and watermark data S representing watermark information s to be embedded at step S602, and carries out color conversion of the original color image data G$_{rgb}$ from the RGB color system into the CMYK color system to obtain color-converted original color image data G$_{cmyk}$ at step S604. The DFT module 52 applies the DFT over the whole watermark data S to generate DFT coefficients H at step S606. The embedding module 46 embeds the DFT coefficients H generated from the watermark data S into the C, M, Y, and K components of the color-converted original color image data G$_{cmyk}$ to obtain embedding-processed color image data G'$_{cmyk}$ at step S608.

This processing routine actualizes the digital watermark embedding process of the fourth embodiment.

F. Modifications

The above embodiments and their applications are to be considered in all aspects as illustrative and not restrictive. There may be many modifications, changes, and alterations without departing from the scope or spirit of the main characteristics of the present invention. Some examples of possible modification are given below.

F-1. Modified Example 1

In the first and the second embodiments discussed above, the watermark information is a bit string having the value of either '0' or '1'. The bit string may be binary image data having the color of each pixel expressed by either white or black. The watermark image defined by the binary image data is, for example, a logo image including a black logo in white background. In this case, pixels in the logo part (black part) have a value '1' and pixels in the non-logo part (white part) have a value '0'.

In the third and the fourth embodiments discussed above, the binary image data is applied for the watermark data.

In any of the first through the fourth embodiments, text information may replace the binary image data.

F-2. Modified Example 2

In the first and the second embodiments discussed above, the watermark information is embedded into transform coefficients in a specific area among the transform coefficients (DCT coefficients or DFT coefficients) generated from the original color image data. In the third and the fourth embodiments, transform coefficients in a specific area among the transform coefficients generated from the watermark data are embedded into the original color image data. The technique of the present invention is, however, not restricted to such applications. If the resistance against the printing and intake process is of less importance, the process may embed the watermark information into the generated transform coefficients or embed the generated transform coefficients into the original color image data.

F-3. Modified Example 3

In the case where a logo image is embedded as the watermark information, it is desirable that the logo in the logo image is smaller than a preset size. When the logo image is subjected to frequency conversion by the DCT or the DFT, the smaller size of the logo results in the smaller DC component and reduces the noise due to the logo image embedded in the original color image data.

F-4. Modified Example 4

The DCT or the DFT is applied for the orthogonal transformation in the above embodiments. Other orthogonal transformations, for example, wavelet transform and modified discrete cosine transform (MDCT) are also applicable.

F-5. Modified Example 5

The procedure of the above embodiment embeds the value $V_0$ into the transform coefficients at the watermark information=0, while embedding the value $V_1$ into the transform coefficients at the watermark information=1. One typical embedding method is addition of the specified value to the transform coefficients. Any of other arithmetic operations, such as subtraction, multiplication, and division, may be carried out to embed the specified value into the transform coefficients.

F-6. Modified Example 6

In any of the above embodiments, the image data consisting of two-dimensional discrete values is the object of embedding the watermark information, so that the two-dimensional DCT or the two-dimensional DFT is applied for the orthogonal transformation. The image data may be regarded as one-dimensional discrete values when the image is successively scanned in the horizontal direction or in the vertical direction. In such cases, one-dimensional DCT or one-dimensional DFT may be applicable for the orghogonal transformation.

F-7. Modified Example 7

In any of the above embodiments, color image data is used as the object of embedding the watermark information. Binary image data, such as a black and white image, may also be the object of embedding the watermark information.

F-8. Modified Example 8

In any of the above embodiments, still image data is used as the object of embedding the watermark information. Motion picture data may also be the object of embedding the watermark information.

F-9. Modified Example 9

In any of the above embodiments, sound data may replace the image data as the object of embedding the watermark information. Namely the technique of the present invention is generally applicable to embed watermark information into digital data. Original image data (including original still image data and original motion picture data) and original sound data as the object of embedding the watermark information may be referred to as 'object data'.

When the sound data is specified as the object of embedding the watermark information, the procedure of the present invention applies the orthogonal transformation over the whole sound data. Even when embedding-processed sound data with the watermark information embedded therein is subjected to certain deformation through digital-to-analog conversion and analog-to-digital reconversion, the technique of the present invention does not require any sophisticated matching process to correct the deviated position and the deformed shape of image blocks due to such deformation, thus ensuring simple extraction of the embedded watermark information.

The characteristic of the present invention is application of the orthogonal transformation, such as the DCT or the DFT, over the whole object data. When the sound data, for example, music is specified as the object data, one piece of music may be regarded as the whole object data.

When the sound data is the object of embedding the watermark information, one-dimensional orthogonal transformation (for example, one-dimensional DCT or one-dimensional DFT) is preferable. Two-dimensional orthogonal transformation may, however, be applicable when the sound data is divided at fixed periods and arrayed on a two-dimensional plane.

What is claimed is:

1. A digital watermark embedding method that embeds watermark information into digital data, the digital watermark embedding method comprising the steps of:

(a) providing the watermark information and object data as an object of embedding the watermark information;

(b) applying a predetermined orthogonal transformation over the whole object data to obtain transform coefficients;

(c) embedding the watermark information into the transform coefficients; and (d) applying an inverse transform of the orthogonal transformation onto the transform coefficients with the watermark information embedded therein, so as to generate embedding-processed object data, wherein the step (c) embeds the watermark information into transform coefficients of an intermediate frequency component among the obtained transform coefficients, and wherein the predetermined orthogonal transformation is two-dimensional discrete cosine transform when the object data consists of two-dimensional discrete values, and the step (c) embeds the watermark information into transform coefficients located on a straight line extending from a direct current component toward a high frequency domain on a two-dimensional plane, among the transform coefficients obtained in the step (b) as two-dimensional transform coefficients.

2. A digital watermark embedding method that embeds watermark information into digital data, the digital watermark embedding method comprising the steps of:

(a) providing the watermark information and object data as an object of embedding the watermark information;

(b) applying a predetermined orthogonal transformation over the whole object data to obtain transform coefficients;

(c) embedding the watermark information into the transform coefficients; and (d) applying an inverse transform of the orthogonal transformation onto the transform coefficients with the watermark information embedded therein, so as to generate embedding-processed object data, wherein the predetermined orthogonal transformation is two-dimensional discrete cosine transform when the object data consists of two-dimensional discrete values, and the step (c) embeds the watermark information into transform coefficients located on a straight line extending from a direct current component toward a high frequency domain on a two-dimensional plane, among the transform coefficients obtained in the step (b) as two-dimensional transform coefficients.

* * * * *